(12) United States Patent
Ishibe

(10) Patent No.: US 6,954,295 B2
(45) Date of Patent: Oct. 11, 2005

(54) LIGHT SCANNING OPTICAL SYSTEM, OPTICAL SCANNING APPARATUS AND IMAGE FORMING APPARATUS USING THE SAME

(75) Inventor: Yoshihiro Ishibe, Utsunomiya (JP)

(73) Assignee: Canon Kabushiki Kaisha, Tokyo (JP)

(*) Notice: Subject to any disclaimer, the term of this patent is extended or adjusted under 35 U.S.C. 154(b) by 132 days.

(21) Appl. No.: 09/774,125

(22) Filed: Jan. 31, 2001

(65) Prior Publication Data

US 2001/0026391 A1 Oct. 4, 2001

(30) Foreign Application Priority Data

Feb. 1, 2000 (JP) ....................................... 2000-023867

(51) Int. Cl.⁷ .............................................. G02B 26/08
(52) U.S. Cl. ...................... 359/196; 359/205; 359/216; 359/204; 347/259
(58) Field of Search ............................... 359/196–226; 347/233, 243–244, 258–261

(56) References Cited

U.S. PATENT DOCUMENTS 5,818,505 A    10/1998   Kato ........................... 347/258
5,883,732 A    3/1999    Takada et al. .............. 359/207
6,185,029 B1 * 2/2001    Ishihara ...................... 359/216

FOREIGN PATENT DOCUMENTS

| EP | 816894    | 1/1998 |
| JP | 6-18800   | 1/1994 |
| JP | 7-27991   | 1/1995 |
| JP | 10-20230  | 1/1998 |
| JP | 11-242179 | 9/1999 |

* cited by examiner

Primary Examiner—James Phan
(74) Attorney, Agent, or Firm—Fitzpatrick, Cella, Harper & Scinto

(57) ABSTRACT

In a light scanning optical system having a first optical system for causing a beam emitted from light source means to be incident on the deflecting surface of a light deflector at a predetermined angle in the sub-scanning cross-section, and a second optical system for imaging the beam reflected and deflected by the light deflector on a surface to be scanned and bringing the deflecting surface of the light deflector and the surface to be scanned into a substantially conjugate relation in the sub-scanning cross-section, when the maximum value and minimum value of the peak intensity in the effective scanning area of a spot imaged on the surface to be scanned by the second optical system are defined as $E_{MAX}$ and $E_{MIN}$, respectively, to satisfy the condition that $0.8 \leq E_{MIN}/E_{MAX}$.

30 Claims, 9 Drawing Sheets

LIGHT SCANNING OPTICAL SYSTEM, OPTICAL SCANNING APPARATUS AND IMAGE FORMING APPARATUS USING THE SAME

BACKGROUND OF THE INVENTION

1. Field of the Invention

This invention relates to a light scanning optical system and an optical scanning apparatus using an oblique incidence optical system and an image forming apparatus using the same, and particularly to an apparatus such as a laser beam printer or a digital copier which well corrects the uniformity of the absolute value of the peak intensity in the light intensity distribution of a spot on a surface to be scanned and is thereby suitable for high-speed and highly definite image formation.

2. Related Background Art

A light scanning optical system (and an optical scanning apparatus) heretofore used in a laser beam printer or a digital copier or the like has a semiconductor laser as light source means, a first optical system for imaging a beam emitted from the light source means as a linear beam long in the main scanning direction near the deflecting surface of a light deflector, and a second optical system for imaging the beam reflected and deflected (deflected and scanned) by the light deflector on a surface to be scanned, and bringing the deflecting surface of the light deflector and the surface to be scanned into a substantially conjugate relation in the sub-scanning cross-section.

The second optical system of such a light scanning optical system is an anamorphic imaging optical system called an fθ lens, and has heretofore been constructed by the use of a plurality of expensive glass lenses and has been difficult to downsize.

In recent years, however, with the progress of the molding technique for plastics and the working technique for mold, it has become possible and has also been put into practical use to construct the imaging optical system (fθ lens) comprised of a plurality of expensive glass lenses by the use of an inexpensive plastic lens.

However, it is still insufficient for the downsizing of the apparatus to simply replace the glass lenses with the plastic lens. Further, the same power as the power of the glass lenses is required of the plastic lens and therefore, the deterioration of imaging performance by the fluctuation of the environment when use is made of plastics inferior in environmental characteristic also poses a problem.

So, a light scanning optical system of a post-objective type having a converging lens disposed in the optical path between the light source and the light deflector before the beam is reflected and deflected by the light deflector is known as realizing a compact and low-cost apparatus. Particularly, when the power of the fθ lens is set to a small level in order to make the environmental characteristic good, the fθ characteristic becomes under-corrected and therefore, it is often practised to make the deflecting surface of the light deflector into a convex shape. In this case, from the viewpoint of the symmetry of aberration correction, design is made such that the beam from the light source enters the light deflector at a predetermined angle from an oblique direction with respect to the deflecting surface of the light deflector, and it is often the case that the beam is reflected and deflected bisymmetrically with respect to the incident beam (with respect to the normal to the deflecting surface at the incidence point).

Also, in recent years, higher-speed and more highly definite performance has been required of apparatuses such as a laser beam printer and a digital copier.

To achieve the higher speed of the apparatus, it is necessary to rotate the light deflector at a high speed. Also, to achieve higher definition, it is necessary to make an imaged spot small in diameter and therefore, the width of the beam must be made great and accordingly, the light deflector itself for reflecting and deflecting the beam must also be made large.

To make the higher speed and higher definition compatible, the light deflector must be rotated at a high speed and be made large, but actually it is very difficult to satisfy the two at a time.

So, as a solution of such a problem, various light scanning optical systems using the so-called overfield scanning method designed such that the beam width in the main scanning direction of the beam incident on the deflecting surface of the light deflector enters (irradiates) astride the plurality of deflecting surfaces of the light deflector have been proposed and also put into practical use.

In the overfield scanning method, there is the characteristic that the size of the imaged spot in the main scanning direction is varied by the scanning angle and therefore, in order to minimize the influence thereof, it is desirable to make such design that as in the prior art, the beam incident on the light deflector is not made to enter from the main scanning cross-section, but the beam emitted from the light source is incident on the light deflector at a predetermined angle from an oblique direction with respect to the deflecting surface of the light deflector, and the beam is reflected and deflected bisymmetrically with respect to the incident beam (with respect to the normal to the deflecting surface at the incident point).

Further, the use of a multibeam laser source having a plurality of light emitting portions as light source means in the above-described light scanning optical system becomes advantageous for further higher speed.

As another means for achieving a higher speed, there is known, for example, a light scanning optical system called a twice incidence scanning method of causing a beam emitted from a light source to be incident on a first deflecting surface of a light deflector, causing the beam reflected and deflected by this first deflecting surface to be again incident on a second deflecting surface differing from the first deflecting surface of the light deflector through a transmitting optical system, and effecting deflection and scanning.

This twice incidence scanning method includes a method called a double angle scanning method, and a method called a surface following method in which a beam entering a second deflecting surface of a light deflector moves following the movement of the deflecting surface, but in both of the two methods, it is difficult to dispose a transmitting optical system in the deflecting surface and therefore, there is adopted a construction designed such that the beam emitted from the light source is incident on the light deflector at a predetermined angle from an oblique direction with respect to the deflecting surface of the light deflector, and the transmitting optical system is disposed while being deviated in the sub-scanning direction with respect to the deflecting surface in the main scanning direction.

However, in the above-described prior-art light scanning optical system, optical scanning apparatus and image forming apparatus of such a construction that the beam emitted from the light source is caused to be incident on the light deflector at a predetermined angle from an oblique direction with respect to the deflecting surface of the light deflector, if as shown in FIG. 16 of the accompanying drawings, a beam (light beam) having a coordinate system of the main scanning direction y, the sub-scanning direction z and the optical axis direction x is incident on the deflecting surface 96a of a polygon mirror 96 at a predetermined angle with respect to the sub-scanning direction, the beam reflected and deflected there does not scan in a plane but scans on a conical plane and therefore, the coordinate system of the beam rotates. At this time, the coordinate system of the beam L0 at the center of scanning does not rotate, but yet beams L1 and L2 at the opposite ends of the scanning area have their coordinate systems rotated in opposite directions as shown in FIG. 17 of the accompanying drawings.

It is well known that there is the problem that even if the coordinate system at the opposite ends of this scanning area tries to image the rotated beam on a surface to be scanned by an anamorphic imaging optical system, the beam spot shape (hereinafter simply referred to also as the "spot shape") is destroyed and is not converged at a point, and good imaging cannot be obtained on the surface to be scanned.

To this problem, in the conventional light scanning optical system of a construction in which the beam emitted from the light source is caused to be incident on the light deflector at a predetermined angle from an oblique direction with respect to the deflecting surface of the light deflector, a scanning lens or a correcting lens is disposed eccentrically in the sub-scanning direction or only a certain surface of a lens is made eccentric in the sub-scanning direction, whereby it is possible to improve the spot shape on the surface to be scanned to a certain degree.

Heretofore, when improving the spot shape, the spot shape has been improved by evaluating the degree of the expause of a spot diagram, or the shape or the like of the equal altitude curve of the beam spot.

Actually, however, it is insufficient for obtaining a good image output to simply correct the spot shape well. Specifically, it is difficult to obtain a good image output unless the uniformity of the absolute value of the peak intensity in the light intensity distribution of the spot on the surface to be scanned is corrected well. This is because even if the shape of the spot is corrected a little well, if the absolute value of the peak intensity is low, it becomes impossible to form a good electrostatic latent image on the surface of a photosensitive drum which is the surface to be scanned.

Heretofore, there has been the problem that the uniformity of the absolute value of the peak intensity in the light intensity distribution of the spot on the surface to be scanned is not taken into account and as the result, the output image is deteriorated.

For example, Japanese Patent Application Laid-Open No. 6-18800 discloses a light scanning optical system of a post-objective type designed such that a beam emitted from a light source is incident on a light deflector at a predetermined angle from an oblique direction with respect to the deflecting surface of the light deflector, and in which the shape of the deflecting surface in the main scanning cross-section is made into an elliptical shape and the entrance surface and exit surface of a correcting lens are made into a shape in which they are displaced in the sub-scanning direction and the spot shape is corrected to a certain degree. In this example, however, the destruction of the spot shape has its spot diagram only visually evaluated and further, the correction of the shape of the spot is still insufficient, and there has been the problem that the uniformity of the absolute value of the peak intensity in the light intensity distribution of the spot on the surface to be scanned is not corrected and it is difficult to obtain a highly definite image output.

Japanese Patent Application Laid-Open No. 7-27991 discloses a light scanning optical system of the post-objective type designed such that a beam emitted from a light source is incident on a light deflector at a predetermined angle from an oblique direction with respect to the deflecting surface of the light deflector, and in which the shape of the deflecting surface in the main scanning cross-section is made into an elliptical shape and the entrance surface of a correcting lens is made into a shape in which it is displaced in the sub-scanning direction, and the spot shape is corrected to a certain degree. In this example, however, the curvature of image field in the main scanning direction by a light component widened in the sub-scanning direction of the beam (beam light) and the curvature of image field in the sub-scanning direction by a light component widened in the main scanning direction of the beam are only evaluated as the degree of the collapse of the spot shape, and this evaluating method can evaluate only the curvature of image field by a light component widened in a cross-section of a particular direction, and the curvature of image field, etc. of light component widened in the other cross-sections are not taken into account. Further, the correction of the curvature of image field in the main scanning direction is insufficient, and there has been the problem that the absolute value of the peak intensity in the light intensity distribution of the spot on the off-axis surface to be scanned is low relative to that on the axis and it is difficult to obtain a highly definite image output.

Japanese Patent Application Laid-Open No. 10-20230 discloses a light scanning optical system of the so-called surface following type in which a beam emitted from a light source is incident on a first deflecting surface of a light deflector, and the beam deflected by the first deflecting surface is again incident on a second deflecting surface of the light deflector differing from the first deflecting surface through a transmitting optical system, and the reincident light follows with the movement of the second deflecting surface, and in which a scanning lens is eccentrically disposed in the sub-scanning direction or the scanning lens is curved in the sub-scanning direction and the shape of a spot is corrected to a certain degree. In this example, however, the shape of the equal altitude curve of the beam spot is merely corrected well as the degree of the collapse of the shape of the spot. To obtain a good image output as previously described, it is insufficient to simply correct the shape of the spot well, and the uniformity of the absolute value of the peak intensity in the light intensity distribution of the spot on the surface to be scanned must be corrected well, and this point is not at all taken into account, and this has led to the problem that it is difficult to obtain a good image output.

Japanese Patent Application Laid-Open No. 11-242179 discloses a post-objective type light scanning optical system designed such that a beam emitted from a light source is incident on a light deflector at a predetermined angle from an oblique direction with respect to the deflecting surface of the light deflector, and having a construction in which a scanning lens is shifted in the sub-scanning direction. In this example, however, only the curvature of scanning lines and fθ characteristic and curvature of image field are evaluated, and the purpose of shifting the scanning lens in the sub-scanning direction takes only the curvature of scanning lines into account, and no consideration is taken about the collapse of the shape of the spot which greatly affects an output image, and this has led to the problem that it is difficult to obtain a good image output.

SUMMARY OF THE INVENTION

It is an object of the present invention to provide a light scanning optical system and an optical scanning apparatus using an oblique incidence optical system and an image forming apparatus using the same in which the uniformity of the absolute value of the peak intensity in the light intensity distribution of a spot on a surface to be scanned is corrected well, whereby the deterioration of an output image attributable to the rotation of the spot which has heretofore posed a problem can be effectively corrected and high-speed and highly definite image formation can be effected.

According to one aspect of the invention, a light scanning optical system comprises an incidence optical system for causing a beam emitted from light source means to be incident on the deflecting surface of a light deflector at a predetermined angle in the sub-scanning cross-section, and an imaging optical system for imaging the beam reflected and deflected by the light deflector on a surface to be scanned, wherein when the maximum value and minimum value of the peak intensity in the effective scanning area of a spot imaged on the surface to be scanned by the imaging optical system are defined as $E_{MAX}$ and $E_{MIN}$, respectively, the following condition is satisfied:

$$0.8 \leq \frac{E_{MIN}}{E_{MAX}}.$$

In the light scanning optical system according to another aspect of the invention, when the difference in the incidence point in the sub-scanning direction on the surface to be scanned between the two marginal rays of the beam reflected and deflected by the deflecting surface of the light deflector in the main scanning direction is defined as $\Delta s$ and the diameter of the spot imaged on the surface to be scanned which becomes $1/e^2$ relative to the peak intensity in the sub-scanning direction is defined as Ds, the following condition is satisfied:

$$\frac{\Delta s}{Ds} \leq 0.9.$$

In the light scanning optical system according to another aspect of the invention, when the beam width of the beam reflected and deflected by the deflecting surface of the light deflector in the main scanning direction is defined as d and the angle of incidence at which the beam from the incidence optical system is incident on the deflecting surface from an oblique direction with respect to a plane containing a normal to the deflecting surface of the light deflector in the sub-scanning cross-section and parallel to the main scanning direction is defined as α and the scanning angle of the beam reflected and deflected by the deflecting surface of the light deflector is defined as θ and the lateral magnification of the imaging optical system in the sub-scanning direction is defined as β, the following condition is satisfied:

$$\frac{2 \times d \times \tan\left(\frac{\theta}{2}\right) \times (\sin\alpha) \times \beta}{Ds} \leq 0.9.$$

In the light scanning optical system according to another aspect of the invention, the optical axis of at least one of lens surfaces constituting the imaging optical system in the sub-scanning cross-section is shifted in the sub-scanning direction relative to the center axis of the beam reflected and deflected by the deflecting surface and travelling toward the central position of the effective scanning area or/and is inclined in the sub-scanning direction.

In the light scanning optical system according to another aspect of the invention, the height of the optical axis of at least one of lens surface constituting the imaging optical system in the sub-scanning cross-section continuously varies in conformity with the lengthwise position in the main scanning direction.

In the light scanning optical system according to another aspect of the invention, at least some of lenses constituting the imaging optical system also constitute the incidence optical system.

In the light scanning optical system according to another aspect of the invention, the beam emitted from the light source means is incident on the deflecting surface of the light deflector in a state in which it is wider than the width of the deflecting surface in the main scanning direction.

In the light scanning optical system according to another aspect of the invention, the beam emitted from the light source means is incident on the deflecting surface from substantially the center of the scanning angle by the light deflector.

In the light scanning optical system according to another aspect of the invention, at least one of lens surfaces constituting the imaging optical system has its radius of curvature in the sub-scanning cross-section continuously varied away from the optical axis of the lens in the main scanning direction.

In the light scanning optical system according to another aspect of the invention, the light source means is a multi-beam laser source having a plurality of light emitting portions.

According to another aspect of the invention, there is provided an optical scanning apparatus characterized by using the above-described light scanning optical system.

According to another aspect of the invention, there is provided an image forming apparatus provided with the above-described optical scanning apparatus, and a printer controller for connecting code data inputted from an external device into an image signal and inputting it to the optical scanning apparatus.

In the above-described image forming apparatus according to another aspect of the invention, an image is formed by background exposure.

According to another aspect of the invention, a light scanning optical system comprises an incidence optical system for causing a beam emitted from light source means to be incident on the deflecting surface of a light deflector at a predetermined angle in the sub-scanning cross-section, and an imaging optical system for imaging the beam reflected and deflected by the light deflector on a surface to be scanned, and bringing the deflecting surface of the light deflector and the surface to be scanned into a substantially conjugate relation in the sub-scanning cross-section, characterized in that when the difference in the incidence point in the sub-scanning direction on the surface to be scanned between the two marginal rays of the beam reflected and deflected by the deflecting surface of the light deflector in the main scanning direction is defined as Δs and the diameter of a spot imaged on the surface to be scanned which becomes $1/e^2$ relative to the peak intensity in the sub-scanning direction is defined as Ds, the following condition is satisfied:

$$\frac{\Delta s}{Ds} \leq 0.9.$$

In the light scanning optical system according to another aspect of the invention, when the beam width of the beam reflected and deflected by the deflecting surface of the light deflector in the main scanning direction is defined as d and the angle of incidence at which the beam from the incidence optical system is incident on the deflecting surface from an oblique direction with respect to a plane containing a normal to the deflecting surface of the light deflector in the sub-scanning cross-section and parallel to the main scanning direction is defined as α and the scanning angle of the beam reflected and deflected by the deflecting surface of the light deflector is defined as θ and the lateral magnification of the imaging optical system in the sub-scanning direction is defined as β, the following condition is satisfied:

$$\frac{2 \times d \times \tan\left(\frac{\theta}{2}\right) \times (\sin\alpha) \times \beta}{Ds} \leq 0.9.$$

In the light scanning optical system according to another aspect of the invention, the optical axis of at least one of lens surfaces constituting the imaging optical system in the sub-scanning cross-section is shifted in the sub-scanning direction with respect to the center axis of the beam reflected and deflected by the deflecting surface and travelling toward the central position of an effective scanning area or/and is inclined in the sub-scanning direction.

In the light scanning optical system according to another aspect of the invention, the height of the optical axis of at least one of lens surfaces constituting the imaging optical system in the sub-scanning cross-section continuously varies in conformity with the lengthwise position in the main scanning direction.

In the light scanning optical system according to another aspect of the invention, at least some of lenses constituting the imaging optical system also constitute the incidence optical system.

In the light scanning optical system according to another aspect of the invention, the beam emitted from the light source means is incident on the deflecting surface of the light deflector in a sate in which it is wider than the width of the deflecting surface in the main scanning direction.

In the light scanning optical system according to another aspect of the invention, the beam emitted from the light source means is incident on the deflecting surface from substantially the center of the scanning angle by the light deflector.

In the light scanning optical system according to another aspect of the invention, at least one of lens surfaces constituting the imaging optical system has its radius of curvature in the sub-scanning cross-section continuously varied away from the optical axis of the lens in the main scanning direction.

In the light scanning optical system according to another aspect of the invention, the light source means is a multi-beam laser source having a plurality of light emitting portions.

According to another aspect of the invention, there is provided an optical scanning apparatus characterized by using the above-described light scanning optical system.

According to another aspect of the invention, there is provided an image forming apparatus provided with the above-described optical scanning apparatus, and a printer controller for converting code data inputted from an external device into an image signal and inputting it to the optical scanning apparatus.

According to another aspect of the invention, there is provided the above-described image forming apparatus characterized in that an image is formed by background exposure.

According to another aspect of the invention, there is provided a light scanning optical system in which a beam emitted from light source means is caused by an incidence optical system to be incident on a first deflecting surface of a light deflector having a plurality of deflecting surfaces at a predetermined angle in the sub-scanning cross-section, and the beam reflected and deflected by the first deflecting surface is caused to be again incident on a second deflecting surface of the light deflector differing from the first deflecting surface through a transmitting optical system, and the beam reflected and deflected by the second deflecting surface is imaged on a surface to be scanned by an imaging optical system, and in the sub-scanning cross-section, the deflecting surface of the light deflector and the surface to be scanned are brought into a substantially conjugate relation, characterized in that when the maximum value and minimum value of the peak intensity in the effective scanning area of a spot imaged on the surface to be scanned by the imaging optical system are defined as $E_{MAX}$ and $E_{MIN}$, respectively, the following condition is satisfied:

$$0.8 \leq \frac{E_{MIN}}{E_{MAX}}.$$

In the light scanning optical system according to another aspect of the invention, when the difference in the incidence point in the sub-scanning direction on the surface to be scanned between the two marginal rays of the beam reflected and deflected by the second deflecting surface of the light deflector in the main scanning direction is defined as Δs and the diameter of the spot imaged on the surface to be scanned which becomes $1/e^2$ relative to the peak intensity in the sub-scanning direction is defined as Ds, the following condition is satisfied:

$$\frac{\Delta s}{Ds} \leq 0.9.$$

In the light scanning optical system according to another aspect of the invention, when the beam width of the beam reflected and deflected by the second deflecting surface of the light deflector in the main scanning direction is defined as d and the angle of incidence at which the beam from the incidence optical system is incident on the first deflecting surface from an oblique direction with respect to a plane containing a normal to the first deflecting surface of the light deflector in the sub-scanning cross-section and parallel to the main scanning direction is defined as a and the scanning angle of the beam reflected and deflected by the second deflecting surface of the light deflector is defined as θ and the lateral magnification of the imaging optical system in the sub-scanning direction is defined as β, the following condition is satisfied:

$$\frac{2 \times d \times \tan\left(\frac{\theta}{2}\right) \times (\sin\alpha) \times \beta}{Ds} \leq 0.9.$$

In the light scanning optical system according to another aspect of the invention, the optical axis of at least one of lens surfaces constituting the imaging optical system in the sub-scanning cross-section is shifted in the sub-scanning direction relative to the center axis of the beam reflected and deflected by the deflecting surface and travelling toward the central position of the effective scanning area or/and is inclined in the sub-scanning direction.

In the light scanning optical system according to another aspect of the invention, the height of the optical axis of at least one of lens surfaces constituting the imaging optical system in the sub-scanning cross-section continuously varies in conformity with the lengthwise position in the main scanning direction.

In the light scanning optical system according to another aspect of the invention, at least some of lenses constituting the imaging optical system also constitute the incidence optical system.

In the light scanning optical system according to another aspect of the invention, the beam emitted from the light source means is incident on the first deflecting surface of the light deflector in a state in which it is wider than the width of the first deflecting surface in the main scanning direction.

In the light scanning optical system according to another aspect of the invention, the beam emitted from the light source means is incident on the first deflecting surface from substantially the center of the scanning angle by the light deflector.

In the light scanning optical system according to another aspect of the invention, at least one of lens surfaces constituting the imaging optical system has its radius of curvature in the sub-scanning cross-section continuously varied away from the optical axis of the lens in the main scanning direction.

In the light scanning optical system according to another aspect of the invention, the light source means is a multi-beam laser source having a plurality of light emitting portions.

According to another aspect of the invention, there is provided an optical scanning apparatus using the above-described light scanning optical system.

According to another aspect of the invention, there is provided an image forming apparatus provided with the above-described optical scanning apparatus, and a printer controller for converting code data inputted from an external device into an image signal and inputting it to the optical scanning apparatus.

According to another aspect of the invention, there is provided the above-described image forming apparatus characterized in that an image is formed by background exposure.

DESCRIPTION OF THE PREFERRED EMBODIMENTS

Figure 1:
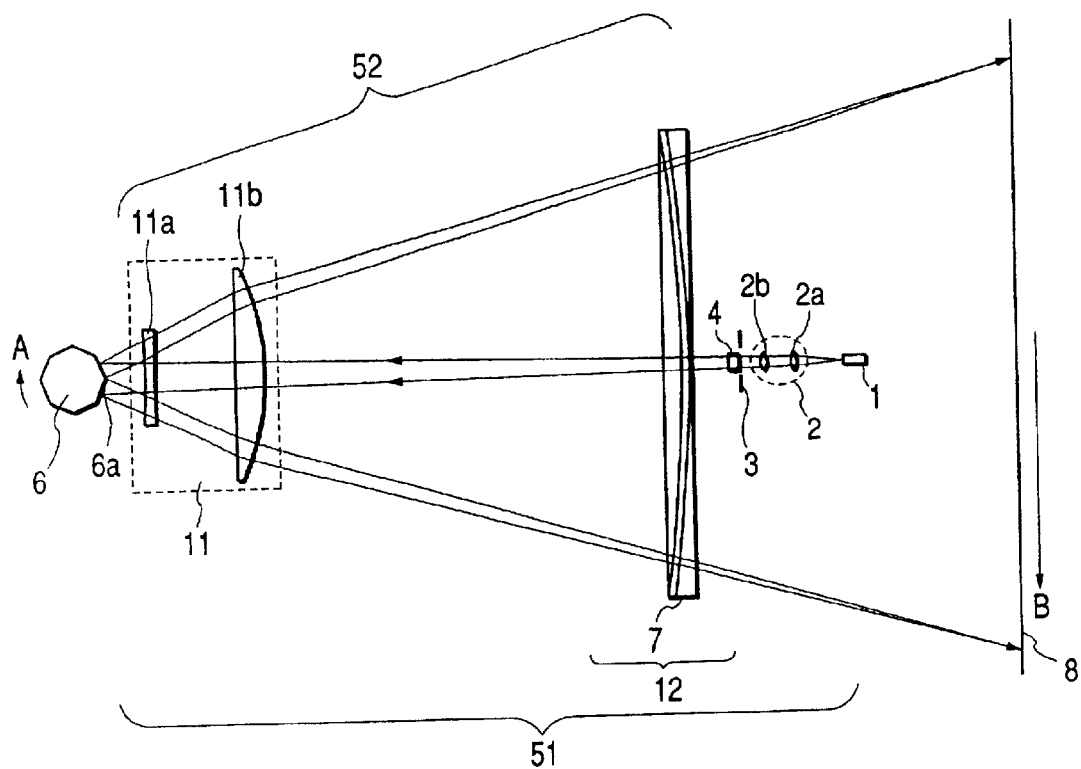
FIG. 1 is a cross-sectional view of the essential portions of Embodiment 1 of the present invention in the main scanning direction.
Figure 2:
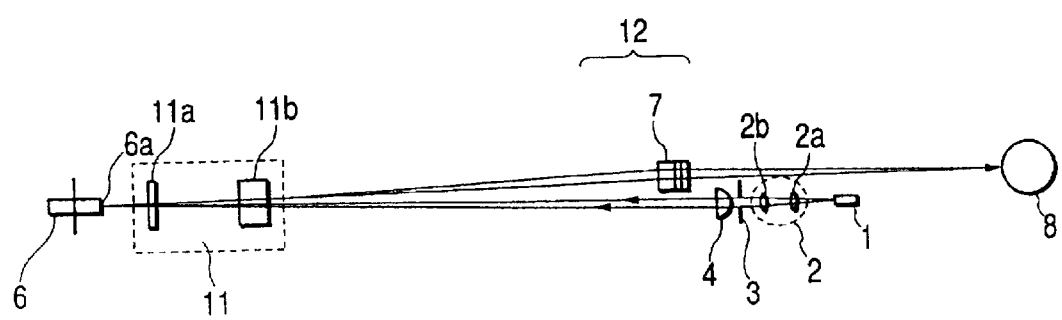
FIG. 2 is a cross-sectional view of the essential portions of Embodiment 1 of the present invention in the sub-scanning direction.

FIG. 1 is a cross-sectional view (main scanning cross-sectional view) of essential portions of Embodiment 1 in the main scanning direction when the light scanning optical system (optical scanning apparatus) of the present invention is applied to an image forming apparatus such as a laser beam printer or a digital copier, and FIG. 2 is a cross-sectional view (sub-scanning cross-sectional view) of essential portions in the sub-scanning direction of FIG. 1.

In these figures, the reference numeral 1 designates light source means comprising, for example, a semiconductor laser. The reference numeral 2 denotes a conversion element portion (collimater lens portion) having a first collimator lens (cemented lens) 2a and a second collimator lens 2b, and this conversion element portion 2 converts a divergent beam emitted from the light source means 1 into a weak divergent beam. The reference numeral 3 designates an aperture stop which limits the beam width of the passing beam in the sub-scanning direction and shapes the beam shape. The reference numeral 4 denotes a cylindrical lens having predetermined refractive power only in the sub-scanning direction, and this cylindrical lens 4 causes the beam passed through the aperture stop 3 to be imaged as a substantially linear image on a light deflecting surface to be described in the sub-scanning cross-section.

The collimator lens portion 2, the aperture stop 3 and the cylindrical lens 4 together constitute an element of a first optical system 51 which is an incidence optical system. In the present embodiment, the first optical system 51 is disposed so that the beam emitted from the light source means 1 may be incident on the deflecting surface 6a of a light deflector 6 at a predetermined angle from an oblique direction in the sub-scanning cross-section (an oblique incidence optical system).

The reference numeral 6 designates a polygon mirror which is a light deflector rotated at a predetermined angular speed in the direction of arrow A by driving means (not shown) such as a motor.

The reference numeral 52 denotes an imaging optical system (fθ lens system) as a second optical system having a scanning lens portion 11 and a correcting lens portion 12.

The scanning lens portion 11 has a first scanning lens 11a comprising a concave lens and a second scanning lens 11b comprising a convex lens, and causes the beam reflected and deflected at a predetermined angular speed by the light deflector 6 to be imaged on a surface 8 to be scanned chiefly in the main scanning direction, and also effects correction so that the beam may assume a constant speed on the surface 8 to be scanned. That is, the scanning lens portion 11 well corrects the curvature of image field and the fθ characteristic chiefly in the main scanning direction. Also, it is of such a construction that before the beam having emerged from the first optical system 51 is incident on the deflecting surface 6a of the light deflector 6, the beam passes through the scanning lens portion 5 and then is incident on the deflecting surface 6a. That is, it is of such a construction that the scanning lens portion 5 shares a part of the function of the first optical system 51. Such a construction will hereinafter be referred to as the double pass.

The correcting lens portion 12 has a single correcting lens 7 formed of a plastic material. The correcting lens 7 has little power in the main scanning direction and has strong power in the sub-scanning direction, and causes the beam reflected and deflected (deflected and scanned) by the light deflector 6 to be imaged on the surface 8 to be scanned chiefly in the sub-scanning direction, and also brings the deflecting surface 6a of the light deflector 6 and the surface 8 to be scanned into a substantially conjugate relation in the sub-scanning cross-section.

The surface 8 to be scanned comprises, for example, the surface of a photosensitive drum.

In the present embodiment, the divergent beam light-modulated and emitted from the semiconductor laser 1 is converted into a weak divergent beam by the collimator lens portion 2, and has its light amount limited by the aperture stop 3 and enters the cylindrical lens 4. Of the beam which has entered the cylindrical lens 4, the beam in the sub-scanning cross-section is converged and is transmitted through the second scanning lens 11b and the first scanning lens 11a and is incident on the deflecting surface 6a of the light deflector 6, and is imaged as a substantially linear image (a linear image long in the main scanning direction) near the deflecting surface 6a. At this time, the beam incident on the deflecting surface 6a is incident on the deflecting surface 6a of the light deflector 6 at a predetermined angle from an oblique direction (an oblique incidence optical system). That is, the beam from the first optical system 51 is incident on the deflecting surface 6a from an oblique direction in the sub-scanning cross-section.

On the other hand, in the main scanning cross-section, the beam is transmitted through the second scanning lens 11b and the first scanning lens 11a in its intact state (the state of the weak divergent beam), whereby it is converted into a substantially parallel beam, and is incident on the deflecting surface 6a from substantially the center of the scanning angle by the light deflector 6 (front incidence). The beam width of the substantially parallel beam at this time is set so as to be sufficiently wide in the main scanning direction relative to the facet width of the deflecting surface 6a of the light deflector 6 (an overfield scanning optical system).

The beam reflected and deflected by the deflecting surface 6a of the light deflector 6 is then directed onto the surface 8 of the photosensitive drum through the first scanning lens 11a, the second scanning lens 11b and the correcting lens 7, and optically scans the surface 8 of the photosensitive drum in the direction of arrow B (the main scanning direction) by the light deflector 6 being rotated in the direction of arrow A. Thereby, image recording is effected on the surface 8 of the photosensitive drum as a recording medium.

Figure 3:
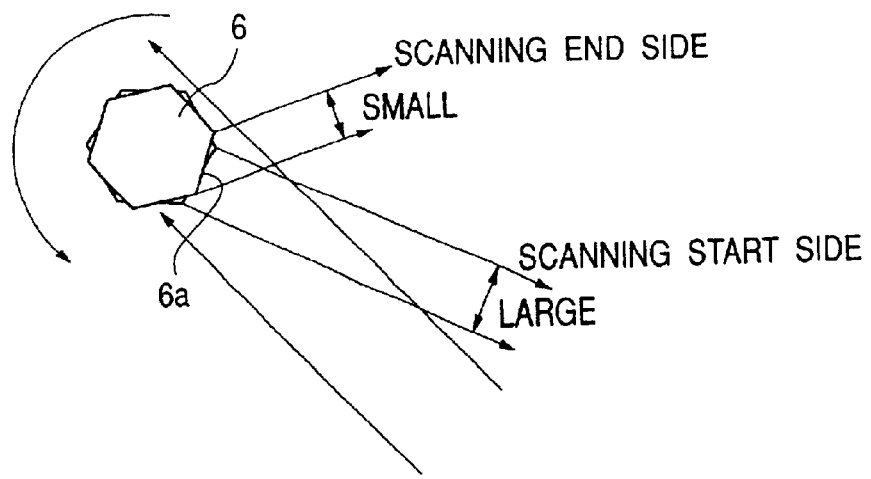
FIG. 3 shows the state of the incidence onto the light deflector of an underfield optical system.

In the present embodiment, as shown in FIG. 3, the beam is caused to be incident in a state in which the beam width of the beam passed through the first optical system (not shown) in the main scanning direction is wider than the width of the deflecting surface 6a of the light deflector 6 in the main scanning direction (a so-called overfield optical system).

Figure 4:
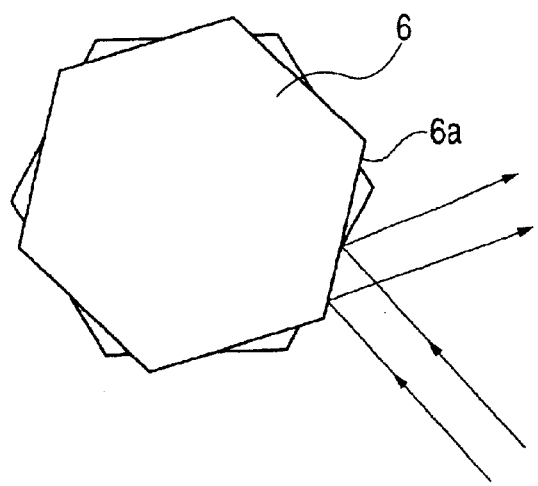
FIG. 4 shows the state of the incidence onto the light deflector of an overfield optical system.

On the other hand, in a light scanning optical system heretofore generally used, as shown in FIG. 4, the beam is caused to be incident in a state in which the beam width of the beam passed through a first optical system (not shown) in the main scanning direction is narrower than the width of the deflecting surface 6a of the light deflector 6 in the main scanning direction (a so-called underfield optical system).

As can be seen from FIGS. 3 and 4, when it is assumed that the beam width of the beam incident on the second optical system in the main scanning direction is the same, apparently the overfield optical system is very advantageous for a higher speed and higher resolution because it is possible to set the light deflector 6 small and set the number of the deflecting surfaces to a great number.

On the other hand, if in the overfield optical system, as shown in FIG. 3, the beam to be caused to be incident on the light deflector 6 is caused to be incident from a direction similar to that in the underfield optical system, great asymmetry will occur to the beam width in the main scanning direction entering the second optical system at the opposite end portions of a scanning area in the main scanning direction. As the result, a great difference in the spot diameter in the main scanning direction will occur between the start side and end side of scanning on the surface to be scanned, and the light amount will also vary greatly.

Consequently, in the present embodiment, in order to restrain the above-noted evil to an allowable degree, as shown in FIG. 1, the beam to be caused to be incident on the light deflector 6 is caused to be incident from substantially the center of the scanning range in the main scanning direction (front incidence). That is, the beam emitted from the light source means 1 is incident on the deflecting surface 6a from substantially the center of the scanning angle by the light deflector 6.

On the other hand, when such an incidence method is adopted, the first and second optical systems 51 and 52 cannot be disposed on the same plane (the main scanning plane) and therefore, the beam to be caused to be incident on the light deflector 6 is caused to be incident on the light deflector 6 from below at a predetermined angle with respect to the main scanning plane.

In the light scanning optical system using the so-called sub-scanning oblique incidence optical system (hereinafter simply referred to as the "oblique incidence optical system") like the present embodiment, as previously described, the plane the beam reflected and deflected by the deflecting surface 6a forms does not become a flat plane but forms a conical curved plane and thus, the beam is skew-incident on the correcting lens 7. Therefore, aberrations caused particularly at the end portions of the effective scanning area in the main scanning direction by the skew incidence adversely affect an imaged spot shape (hereinafter simply referred to as the "spot shape", and the spot shape is deteriorated and a desired spot shape becomes unobtainable. Further, under the influence of the skew incidence, the curvature of the scanning lines occurs on the surface 8 to be scanned at the same time.

The correcting lens 7 in the present embodiment effectively corrects the deterioration of the spot shape by the skew incidence and at the same time, well corrects the curvature of the scanning lines by the correcting lens 7 being disposed so that the beam incident on the correcting lens 7 may be incident on a position deviating by a predetermined amount in the sub-scanning direction from the surface vertex in the sub-scanning cross-section at the central position of the correcting lens 7 in the main scanning direction, and the correcting lens 7 being tilted with respect to the beam incident on the correcting lens 7 at the center of the effective scanning area.

Figure 5:
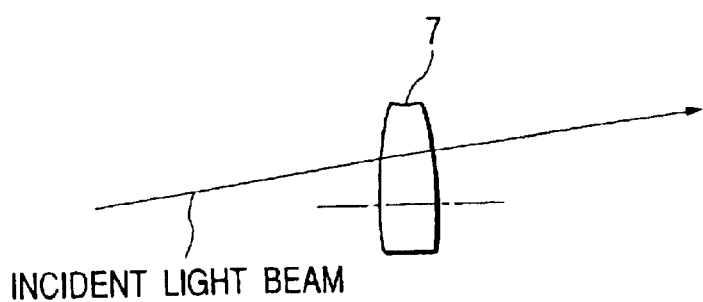
FIG. 5 shows the state of a beam incident on a correcting lens in Embodiment 1 of the present invention.

Specifically, as shown in FIG. 5, the beam incident on the correcting lens 7 is to be incident above the surface vertex in the sub-scanning cross-section of the correcting lens 7 in the sub-scanning direction, and the correcting lens 7 is tilted downwardly relative to the beam incident thereon.

Further, the correcting lens 7 in the present embodiment is of such a shape that the radius of curvature thereof in the sub-scanning cross-section continuously varies away from the optical axis of the lens in the main scanning direction. If the radius of curvature of the correcting lens 7 in the sub-scanning cross-section is kept constant, that is, the correcting lens 7 is made into a simple cylindrical shape and a toric shape, the curvature of image field in the sub-scanning direction will remain. To restrain this curvature of image field in the sub-scanning direction to a small level, the correcting lens 7 can be brought close to the surface 8 to be scanned, but if it is brought too close, the correcting lens 7 will become long and this is not preferable. Also, it is possible to restrain the curvature of image field in the sub-scanning direction to a small level by keeping the radius of curvature of the correcting lens 7 in the sub-scanning cross-section constant, and making the correcting lens 7 into such a shape that the opposite end portions thereof are curved toward the surface 8 to be scanned. However, if the correcting lens 7 is made into the lens shape as described above, it will become difficult to correct the deterioration of the spot shape by the skew incidence.

Accordingly, the correcting lens 7 in the present embodiment is of such a shape that the radius of curvature thereof in the sub-scanning cross-section continuously varies in a direction away from the optical axis of the lens in the main scanning direction, so that the curvature of field in the sub-scanning direction is well corrected over the entire image range and deterioration of the spot shape due to the skew incidence is effectively corrected.

The correction of the deterioration of the spot shape in the oblique incidence optical system has heretofore been variously done, and when improving the shape, the spot shape has been improved by effecting the evaluation of the degree of the expause of a spot diagram by geometrical-optical ray pursuit or the shape or the like of the equal intensity curve of a wave-optical imaged spot (hereinafter simply referred to also as the "spot").

Actually, however, it is often the case that even if the degree of the expause of the spot diagram by the geometrical-optical ray pursuit or the shape or the like of the equal intensity curve of the wave-optical imaged spot is corrected into a visually good shape, it is insufficient to obtain a good image output.

Specifically, it cannot be said to be sufficient unless the ratio between the absolute value of the peak intensity of the wave-optical intensity distribution of the spot at any scanning position on the surface 8 to be scanned and the absolute value of the peak intensity of the wave-optical intensity distribution of the spot in which the collapse of the center of scanning is relatively small is corrected so as to be equal to or greater than a certain value.

The deterioration of the spot shape in the oblique incidence optical system is caused chiefly by asymmetry being created in the aberration of the peripheral portion of the beam by the beam being skew-incident on the lens, but a certain degree of asymmetry is also created in the aberration of the vicinity of the principal ray of the beam.

Such a deteriorated spot, if the asymmetry of the aberration in the peripheral portion of the beam is improved to a certain degree, will visually look like well corrected in the degree of the expanse of the spot diagram by the geometrical-optical ray pursuit of the spot or the shape of the equal intensity curve of the wave-optical spot.

However, it is often the case that the asymmetry of the aberration of the vicinity of the principal ray of the beam still remains and therefore the absolute value of the peak intensity of the wave-optical intensity distribution of the spot is not corrected to a sufficiently high level, as compared with the absolute value of the peak intensity of the central portion of scanning.

If the peak intensity is not corrected to a sufficiently high level, a good electrostatic latent image cannot be formed on the surface 8 to be scanned such as the photosensitive drum, and as the result, it becomes impossible to obtain a good output image.

According to the applicant's studies, it has been found that deterioration is recognized in the output image when the ratio $E_{MIN}/E_{MAX}$ between the maximum value $E_{MAX}$ and minimum value $E_{MIN}$ of the absolute value of the peak intensity of the wave-optical intensity distribution of each spot in the effective scanning area on the surface 8 to be scanned is below 0.8.

More specifically, when the ratio $E_{MIN}/E_{MAX}$ lowers to the order of 0.8, there occurs the phenomenon that in the gradation pattern of halftone, in the case of low density, the reproducibility of each dot is deteriorated and density does not join and the image becomes blank in white, and in the case of high density, the spaces among dots are filled with black.

The result that deterioration is recognized in the output image when the ratio $E_{MIN}/E_{MAX}$ is below 0.8 is generally called Strehl ratio intensity, and substantially coincides with the limit of the so-called Strehl ratio intensity in which the ratio I/IO between the peak intensity $I_0$ of a diffracted image in no-aberration and the peak intensity I of the diffracted image reduced in luminance by aberration is 0.8 or greater.

In a light scanning optical system used in an ordinary image forming apparatus or the like, the F number (F/no.) on the surface to be scanned side in the main scanning and sub-scanning directions is of the order of 30 even if it is bright, and particularly at the scanning central position in the main scanning direction, asymmetrical aberrations hardly occur and therefore, it is not necessary to take the influence of high-order aberrations in the interior of the beam so much into consideration. In this case, the maximum value $E_{MAX}$ of the absolute value of the peak intensity of the wave-optical intensity distribution of the aforementioned spot may be considered to become substantially equal to the peak intensity $I_0$ of the diffracted image at no aberration.

However, in the light scanning optical system using the oblique incidence optical system like the present embodiment, as previously described, the beam incident on the correcting lens 7 is caused to be incident above the surface vertex in the sub-scanning cross-section of the correcting lens 7 in the sub-scanning direction and therefore, asymmetrical aberration occurs in the sub-scanning direction even at the scanning central position in the main scanning direction. In this case, the maximum value $E_{MAX}$ of the absolute value of the peak intensity of the wave-optical intensity distribution of the spot does not become equal to the peak intensity $I_0$ of the diffracted image at no-aberration, but assumes a value somewhat lower than the peak intensity $I_0$.

The present embodiment is characterized in that the minimum value $E_{MIN}$ of the absolute value of the peak intensity of the wave-optical intensity distribution of each spot in the effective scanning area on the surface 8 to be scanned is not compared with the peak intensity $I_0$ of the diffracted image at no-aberration, but is compared with the maximum value $E_{MAX}$ of the absolute value of the peak intensity of the wave-optical intensity distribution of each spot in the effective scanning area on the surface 8 to be scanned. That is, the uniformity of the absolute value of the peak intensity in the light intensity distribution of the spot on the surface 8 to be examined is corrected well.

The reason why correction is effected as described above is that for example, the difference in gradation by the difference in imaging performance depending on the location can be clearly visually confirmed and as an image, the quality is reduced and recognized, but when a generally minute aberration joins, as offset, even an image liable to be affected by imaging performance like the gradation pattern or the like of halftone, the influence thereof is generally only a minute variation in the density of the image and the image is not recognized as being reduced in quality. what is important is the uniformity of the absolute value of the peak intensity in the light intensity distribution of the spot on the surface 8 to be scanned.

Figure 6:
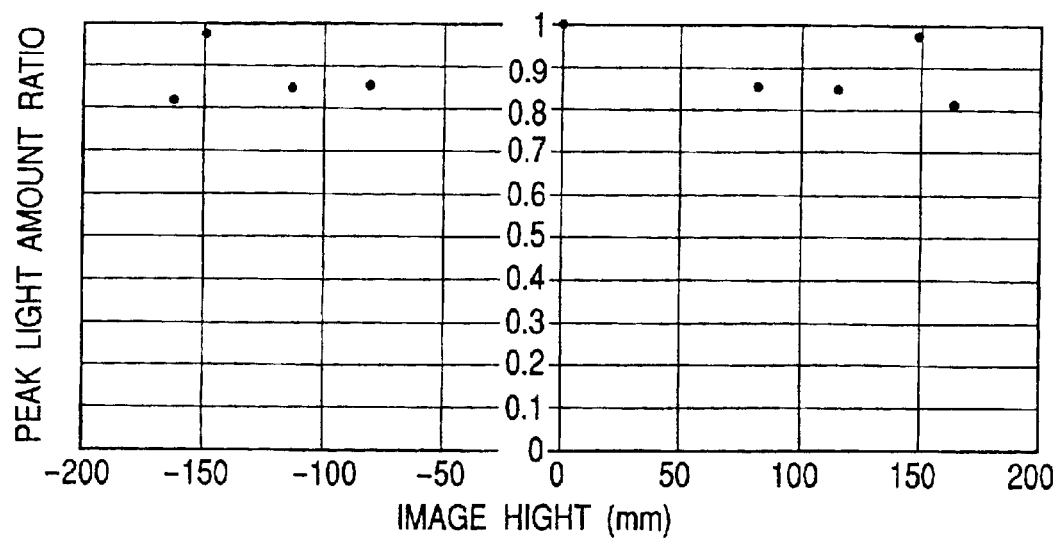
FIG. 6 shows the peak intensity ratio of an imaged spot in Embodiment 1 of the present invention.

In the present embodiment, with the ratio of the absolute value of the above-mentioned peak intensity as a measure for evaluation, as shown in FIG. 6, the deterioration of the spot shape is corrected so that the ratio between the maximum value $E_{MAX}$ and minimum value $E_{MIN}$ of the absolute value of the peak intensity of the wave-optical intensity distribution of each spot in the effective scanning area on the surface 8 to be scanned may satisfy the condition that $$0.8 \le \frac{E_{MIN}}{E_{MAX}}, \quad (1)$$

whereby, there is obtained a light scanning optical system in which the deterioration of the output image is corrected effectively and which is suitable for a highly definite image output.

Specifically, to correct the deterioration of the spot shape so that the ratio $E_{MIN}/E_{MAX}$ between the maximum value $E_{MAX}$ and minimum value $E_{MIN}$ of the absolute value of the peak intensity of the wave-optical intensity distribution of each spot in the effective scanning area on the surface 8 to be scanned may be 0.8 or greater, it can be substantially achieved by correcting the difference $\Delta s$ in the incidence point (arrival point) in the sub-scanning direction on the surface 8 to be scanned between the two marginal rays of the beam reflected and deflected by the deflecting surface 6a in the main scanning direction to a certain value or less.

Figure 7:
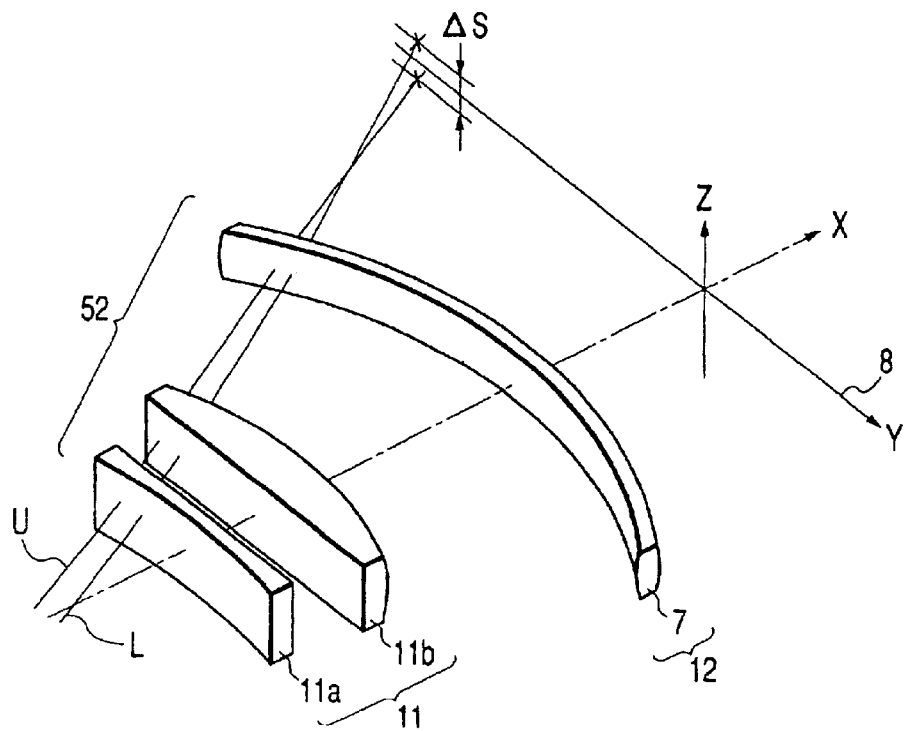
FIG. 7 shows the imaging of a marginal ray in the main scanning direction in the sub-scanning oblique incidence.

Here, description will be made in detail with reference to FIG. 7. FIG. 7 is a schematic view of essential portions showing the manner in which the beam at the end portion of the effective scanning area in the present embodiment passes through the second optical system 52 and is incident on the surface 8 to be scanned.

In FIG. 7, the two marginal rays U and L of the beam in the main scanning direction, because the coordinate system of the beam rotates as previously described, cannot concentrate at a point, but is incident on a position spaced apart by $\Delta s$ chiefly in the sub-scanning direction as shown in FIG. 7 when they are incident on the surface 8 to be scanned by the second optical system 52.

Figure 8:
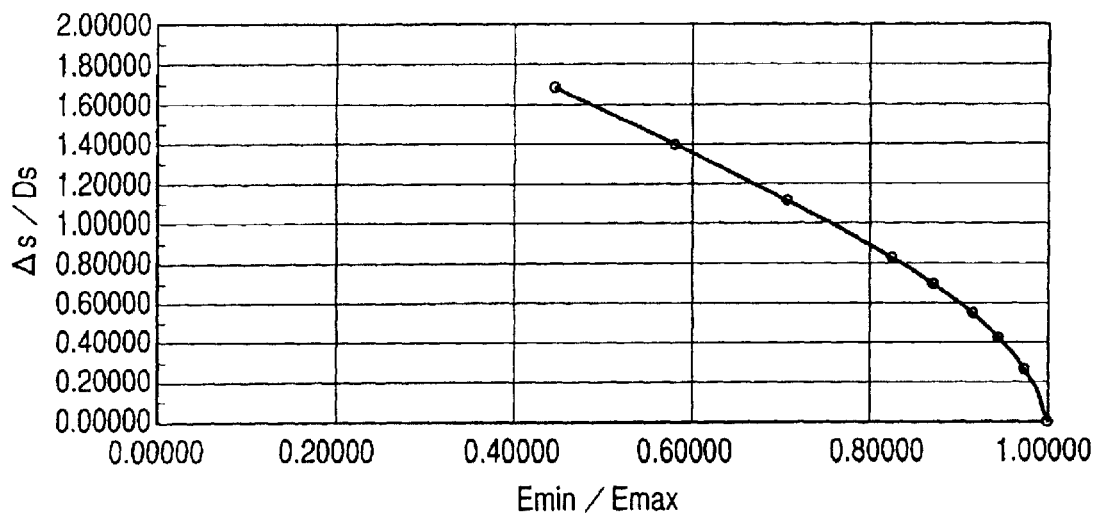
FIG. 8 shows the relation between $E_{MIN}/E_{MAX}$ and $\Delta s/Ds$ on a surface to be scanned.

On the other hand, the two marginal rays U and L of the beam at the central portion of scanning in the main scanning direction, because the coordinate system of the beam is not rotating, do not deviate in the sub-scanning direction when they are incident on the surface 8 to be scanned. FIG. 8 shows the result of the simulation of the relation between the aforementioned $E_{MIN}/E_{MAX}$ and $\Delta s/Ds$ when such diameter (spot diameter) of the spot when as described above, the two marginal rays U and L in the main scanning direction do not deviate from each other that becomes $1/e^2$ (e: the bottom of a natural logarithm) relative to the peak intensity in the sub-scanning direction is defined as Ds and there is no defocus in the image planes in the main scanning and sub-scanning directions. It can be apparently seen from FIG. 8 that in order that the ratio $E_{MIN}/E_{MAX}$ between the maximum value $E_{MAX}$ and minimum value $E_{MIN}$ of the absolute value of the peak intensity of the wave-optical intensity distribution of each spot in the effective scanning area on the surface 8 to be scanned may be 0.8 or greater, the ratio $\Delta s/Ds$ must be 0.9 or less.

Figure 9:
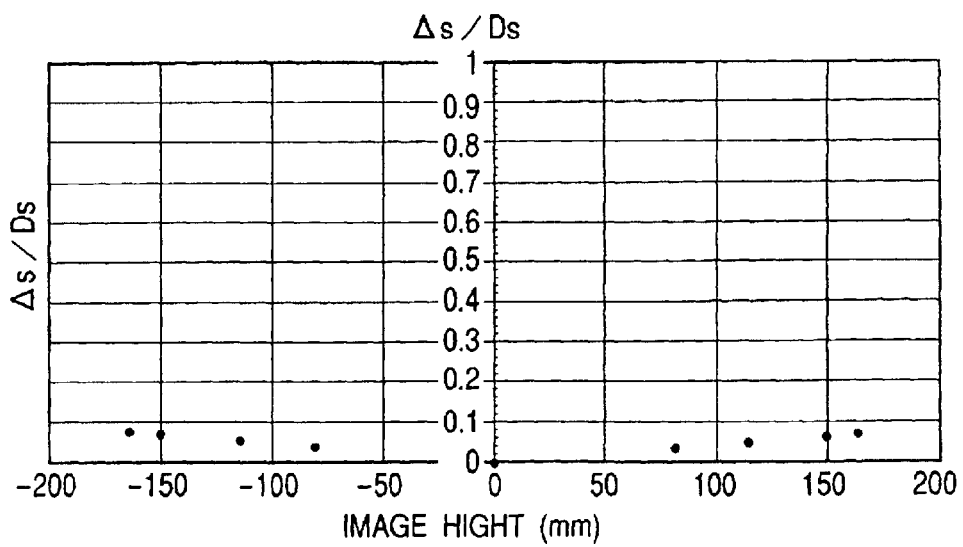
FIG. 9 shows the characteristic of $\Delta s/Ds$ in Embodiment 1 of the present invention.

So, in the present embodiment, in order that the ratio $E_{MIN}/E_{MAX}$ may be 0.8 or greater, specifically $\Delta s/Ds$ which is the ratio between the amount of deviation $\Delta s$ in the sub-scanning direction when the two marginal rays U and L of the beam in the main scanning direction are incident on the surface 8 to be scanned and such diameter Ds of the spot when the two marginal rays U and L in the main scanning direction do not deviate from each other that becomes $1/e^2$ relative to the peak intensity in the sub-scanning direction is corrected so as to satisfy the condition that $$\frac{\Delta s}{Ds} \le 0.9, \quad (2)$$

as shown in FIG. 9.

The above-mentioned conditional expression (2) is the condition when as previously described, there is no defocus in the image planes in the main scanning and sub-scanning directions, and when there is any defocus in the image planes in the main scanning and sub-scanning directions, the upper limit value of the above-mentioned conditional expression (2) must be a smaller value. Consequently, in a light scanning optical system using an ordinary oblique incidence optical system, to satisfy the above-mentioned conditional expression (1) in order to effectively correct the deterioration of the output image and obtain a highly definite image output, the above-mentioned conditional expression (2) must be satisfied without fail.

In the present embodiment, there is obtained a light scanning optical system in which the deterioration of the spot shape is corrected so as to satisfy both of the above-mentioned conditional expressions (1) and (2) to thereby correct the deterioration of the output image effectively and which is suitable for a highly definite image output.

Table 1 below shows the characteristics of the light scanning optical system according to the present embodiment.

In Table 1, Rm and Rs represent the radii of curvature in the main scanning cross-section and the sub-scanning cross-section, respectively. The shape of the correcting lens 7 in the main scanning cross-section is an arcuate shape of which the radius of curvature is R, while on the other hand, the shape thereof in the sub-scanning cross-section is such that the radius of curvature $\gamma'$ is which the lens surface coordinate in the main scanning direction is Y is represented by the following expression:

$$\gamma' = \gamma(1 + D_2 Y^2 + D_4 Y^4 + D_6 Y^6 + D_8 Y^8 + D_{10} Y^{10})$$

($\gamma$ is the radius of curvature on the optical axis, and $D_2$, $D_4$, $D_6$, $D_8$ and $D_{10}$ are coefficients.)

TABLE 1

| | | | |
|---|---|---|---|
| wavelength used | $\lambda$(nm) | 655 | |
| lightsource - first surface of collimator lens | d0 | 32.55 | |
| collimator lens | radius of curvature | thickness | refractive index |
| first surface of collimator lens | 117.9 | 2.00 | 1.74742 |
| second surface of collimator lens | 17.4 | 3.00 | 1.63678 |
| third surface of collimator lens | −22.3 | 11.68 | 1 |
| fourth surface of collimator lens | −56.2 | 5.00 | 1.51389 |
| fifth surface of collimator lens | ∞ | — | 1 |
| distance between fifth surface of collimator lens and aperture stop | d5 | 7.53 | |
| shape of aperture stop | main scanning 7.5 × sub-scanning 2.6 lectangular shape | | |
| aperture stop - first surface of cylindrical lens | d6 | 10.50 | |
| cylindrical lens | radius of curvature | thickness | refractive index |
| first surface of cylindrical lens | Rm:∞ Rs:48.1 | 6 | 1.51389 |
| second surface of cylindrical lens | ∞ | — | 1 |
| second surface of cylindrical lens - polygon reflecting point | d7 | 333.13 | |
| polygon reflecting point - first surface of scanning lens | d8 | 24.81 | |
| scanning lens | radius of curvature | thickness | refractive index |
| first surface of scanning lens | Rm:−356 Rs:∞ | 4.00 | 1.77610 |
| second surface of scanning lens | ∞ | 41.50 | 1 |
| third surface of scanning lens | ∞ | 15.00 | 1.69658 |
| fourth surface of scanning lens | −152.6 | — | 1 |
| fourth surface of scanning lens - first surface of correcting lens | d12 | 299.40 | | shape of correcting lens

| first surface | | second surface | |
|---|---|---|---|
| Rm | −1200.000 | Rm | −1200.000 |
| Rs | 114.000 | Rs | −120.000 |
| D2 | 6.700E−06 | D2u | 7.900E−06 |
| D4 | 0.000E+00 | D4u | 0.000E+00 |
| D6 | 0.000E+00 | D6u | 0.000E+00 |
| D8 | 0.000E+00 | D8u | 0.000E+00 |
| D10 | 0.000E+00 | D10u | 0.000E+00 |

| | | |
|---|---|---|
| thickness of correcting lens | d13 | 4.00 |
| refractive index of correcting lens | N13 | 1.52757 |
| correcting lens - surface to be scanned | d14 | 166.28 |
| sub-scanning magnification of second optical system (scanning lens and correcting lens) | $\beta$ | 0.570 |
| amount of shift of first surface and second surface of correcting lens in the sub-scanning direction | Shift | −1.57 |
| amount of tilt of first surface and second surface of correcting lens | Tilt | −0.80 |
| sub-scanning angle of incidence on first optical system | $\alpha$ | 0.80 |
| maximum scanning angle | $\theta$max | 27.00 |
| polygon | $\phi$29 dodecahedron | |

Figures 10A, 10B:
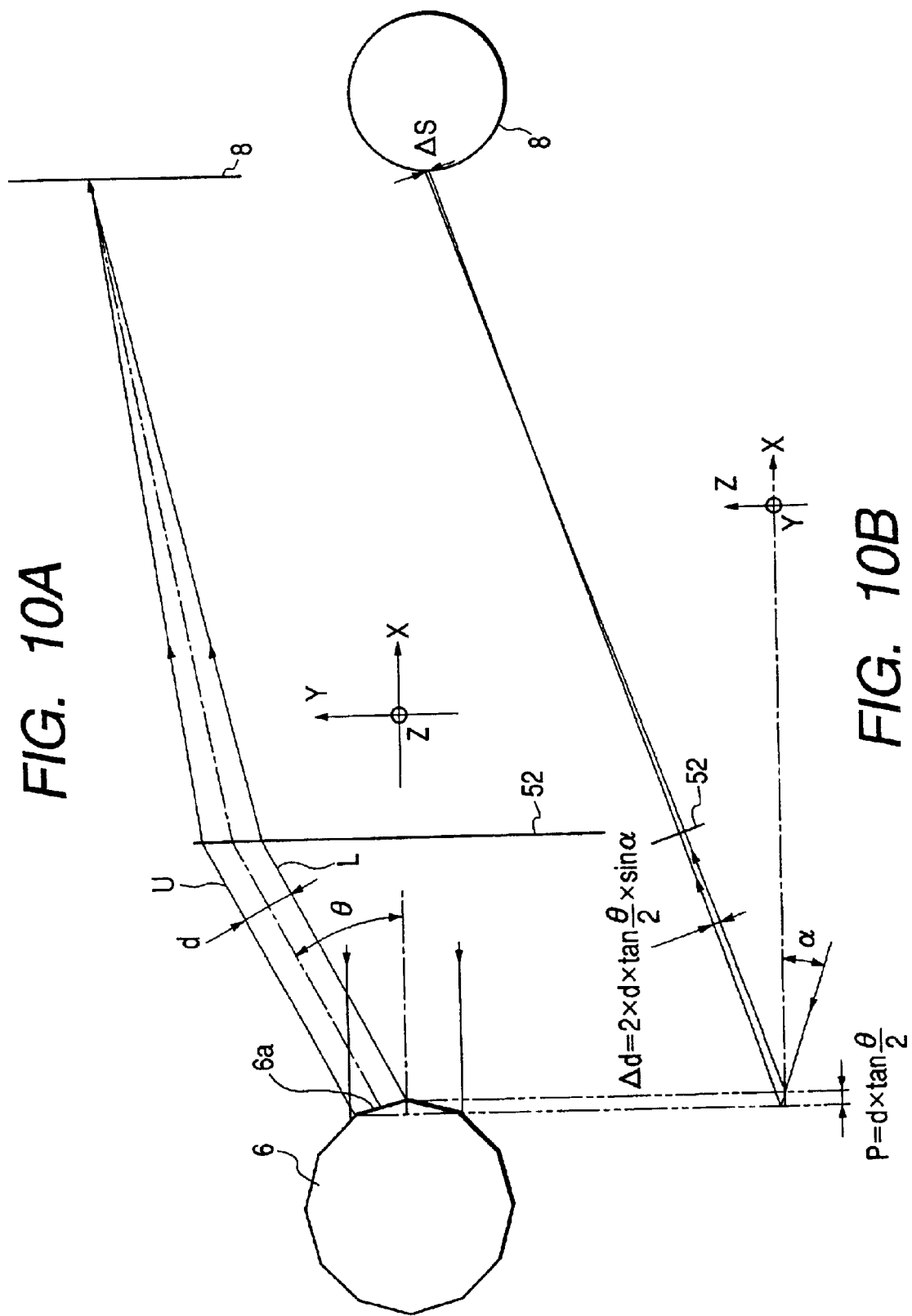
FIGS. 10A and 10B illustrate the deviation in the sub-scanning direction of the marginal ray in the main scanning direction in oblique incidence.

Reference is now had to FIGS. 10A and 10B to describe the phenomenon that when the beam at the end portion of the effective scanning area passes through the scanning lens portion 5 and the correcting lens portion 7 and is incident on the surface 8 to be scanned, the two marginal rays U and L in the main scanning direction are incident on positions spaced apart by Δs in the sub-scanning direction.

FIG. 10A is a main scanning cross-sectional view showing the optical path along which the beam passed through the first optical system (not shown) in the present embodiment is reflected and deflected by the deflecting surface 6a of the light deflector 6 and passes to the surface 8 to be scanned via the second optical system 52, and FIG. 10B is a sub-scanning cross-sectional view of FIG. 10A. In order to simplify the description, the second optical system 52 is depicted typically.

Assuming that when the maximum scanning angle of the beam reflected and deflected by the deflecting surface 6a of the light deflector 6 is θ, the beam width of the beam reflected and deflected by the deflecting surface in the main scanning direction is d, the positions at which the two marginal rays U and L in the main scanning direction are reflected and deflected by the deflecting surface 6a of the light deflector 6 deviate by P from each other in X direction in the shown coordinate system. This amount of deviation P is represented as $$P = d \times \tan\frac{\theta}{2}$$

by the use of the scanning angle θ and the beam width d.

When as previously described, the two marginal rays U and L in the main scanning direction deviate by P from each other in X direction in the shown coordinate system, a deviation of Δd occurs between these two marginal rays U and L in a cross-section perpendicular to the direction in which the beam after reflected and deflected by the deflecting surface 6a of the light deflector 6 travels.

This amount of deviation Δd is represented as $$\Delta d = 2 \times d \times \tan\left(\frac{\theta}{2}\right) \times \sin\alpha$$

by the use of the angle (hereinafter referred to also as the "angle of oblique incidence) α at which the beam from the first optical system is incident on the deflecting surface 6a of the light deflector 6 from an oblique direction in the sub-scanning cross-section.

Assuming here that the lateral magnification of the second optical system in the sub-scanning direction is β, the two marginal rays U and L have their incidence points (arrival points) deviated from each other by an amount corresponding to the above-mentioned amount of deviation Δd multiplied by the lateral magnification β in the sub-scanning direction on the surface 8 to be scanned.

The amount of deviation Δs at this time is represented as $$\Delta s = 2 \times d \times \tan\left(\frac{\theta}{2}\right) \times (\sin\alpha) \times \beta.$$

Consequently, the above-mentioned conditional expression (2) can be represented as follows:

$$\frac{2 \times d \times \tan\left(\frac{\theta}{2}\right) \times (\sin\alpha) \times \beta}{Ds} \leq 0.9 \quad (3)$$

That is, by suitably setting the scanning angle θ, the beam width d, the angle of oblique incidence α, the lateral magnification β, etc. so as to satisfy the above-mentioned conditional expression (3) within the entire effective scanning range, it becomes possible to obtain a light scanning optical system in which the deterioration of the output image is corrected effectively and which is suitable for a highly definite image output.

The above-mentioned conditional expression (3) supposes a case where the optical axis of the second optical system 52 in the sub-scanning cross-section coincides with the center axis of the beam deflected and scanned by the deflecting surface 6a of the light deflector 6 and travelling toward the central position of the effective scanning area. That is, when the second optical system 52 is honestly disposed, it becomes requisite to satisfy the above-mentioned conditional expression (3).

On the other hand, when as in the present embodiment, the correcting lens 7 is disposed while being deviated by a predetermined amount in the sub-scanning direction relative to the center axis of the aforementioned beam, or is disposed while being tilted by a predetermined amount in the sub-scanning direction, it is possible to correct the value of the amount of deviation Δs by that disposition so as become smaller and therefore, it does not always become requisite to satisfy the above-mentioned conditional expression (3). However, if the angle of oblique incidence α, the lateral magnification β, the scanning angle θ etc. are set beyond the range of the above-mentioned conditional expression (3), the setting for satisfying the aforementioned conditional expression (1)

$$0.8 \leq \frac{E_{MIN}}{E_{MAX}}.$$

will become difficult and therefore, it is desirable to satisfy the above-mentioned conditional expression (3).

In the present embodiment, use is made of a light deflector (polygon mirror comprising a dodecahedron having a circumcircle diameter of 29 mm, and the maximum scanning angle θ is 27° and therefore, the width d of the beam reflected and deflected by this light deflector is d=7.56 (mm).

Also, the angle of oblique incidence α is 0.8°, the lateral magnification β is 0.57 time and the spot diameter Ds of Embodiment 1 in the sub-scanning direction is 0.064 mm (64 µm) and therefore, $$\frac{2 \times d \times \tan\left(\frac{\theta}{2}\right) \times (\sin\alpha) \times \beta}{Ds} = \frac{2 \times 7.56 \times \tan\left(\frac{27}{2}\right) \times \sin 0.8 \times 0.57}{0.064} \leq 0.9, \quad (3)$$

and this satisfies the above-mentioned conditional expression (3).

In the present embodiment, as described above, there is obtained a light scanning optical system in which the deterioration of the spot shape is corrected so as to satisfy the above-mentioned conditional expression 1 prescribing the ratio between the maximum value $E_{MAX}$ and minimum value $E_{MIN}$ of the absolute value of the peak intensity of the wave-optical intensity distribution of each spot in the effective scanning area on the surface 8 to be scanned, whereby the deterioration of the output image is corrected effectively, and which is suitable for a highly definite image output.

More specifically, there is obtained a light scanning optical system in which the beam incident on the correcting lens 7 is caused to be incident while being displaced by a predetermined amount in the sub-scanning direction from the surface vertex in the sub-scanning cross-section and further, the correcting lens 7 is tilted to thereby correct the deterioration of the spot shape and the curvature of the scanning lines, and the angle of oblique incidence α, the lateral magnification β of the second optical system in the sub-scanning direction, the maximum scanning angle θ, etc. are appropriately set to thereby satisfy the above-mentioned conditional expressions (2) and (3), whereby the deterioration of the output image is corrected effectively, and which is suitable for a highly definite image output.

While in the present embodiment, the correcting lens 7 is tilted to thereby correct chiefly the curvature of the scanning lines, it is also possible to continuously vary the height of the optical axis of at least one surface of the correcting lens in the sub-scanning cross-section in conformity with the lengthwise position in the main scanning direction to thereby correct the curvature of the scanning lines.

Also, while in the present embodiment, the correcting lens 7 is displaced, this is not restrictive, but other lens constituting the second optical system 52 may be displaced.

Also, while in the present embodiment, the scanning optical system is comprised of a so-called overfield scanning system advantageous for a higher speed and higher definition, it is also possible to use a multibeam laser source or the like having a plurality of light emitting portions as the light source means to thereby make a construction more advantageous for a higher speed and higher definition.

[Embodiment 2]

Figure 11:
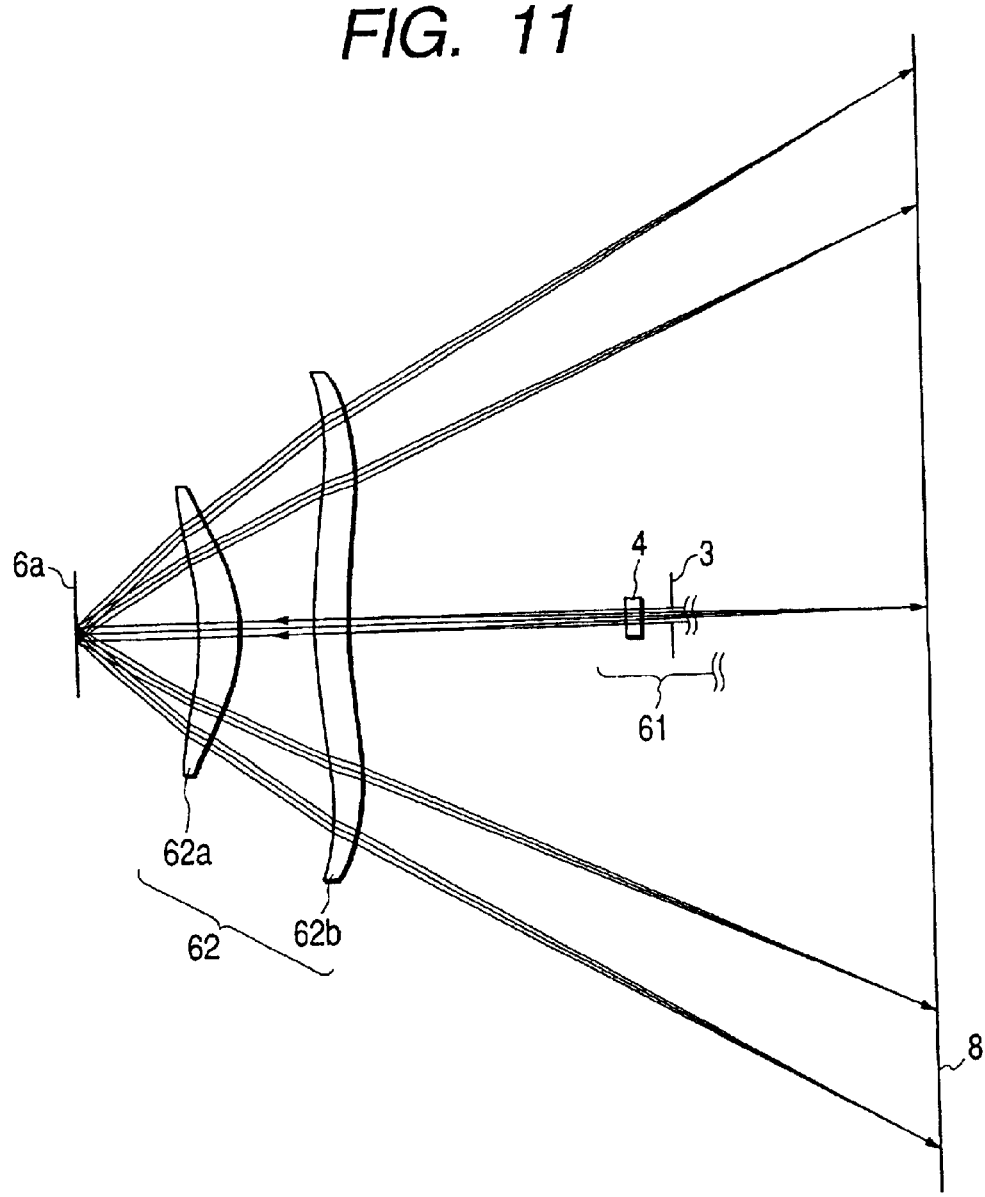
FIG. 11 is a cross-sectional view of the essential portions of Embodiment 2 of the present invention in the main scanning direction.
Figure 12:
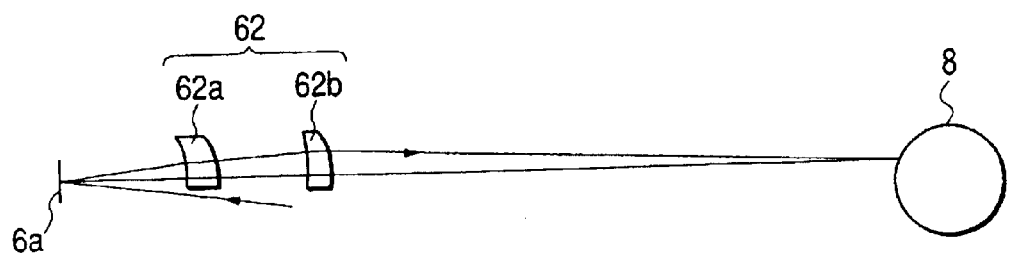
FIG. 12 is a cross-sectional view of the essential portions of Embodiment 2 of the present invention in the sub-scanning direction.

FIG. 11 is a cross-sectional view of the essential portions, in the main scanning direction, of Embodiment 2 when the light scanning optical system (optical scanning apparatus) of the present invention is applied to an image forming apparatus such as a laser beam printer or a digital copier, and FIG. 12 is a cross-sectional view of the essential portions in the sub-scanning direction of FIG. 11. In FIG. 12, for the sake of simplicity, the essential portions are shown with a first optical system omitted. In FIGS. 11 and 12, the same elements as the elements shown in FIGS. 1 and 2 are given the same reference numerals.

The differences of the present embodiment from the aforedescribed Embodiment 1 are that the light scanning optical system is comprised of an underfield scanning optical system, and that a second optical system 62 is comprised of two first and second scanning lenses 62a and 62b. In the other points, the construction and optical action of Embodiment 2 are substantially similar to those of Embodiment 1, whereby a similar effect is obtained.

That is, in FIGS. 11 and 12, the reference numeral designates a second optical system having a first scanning lens 62a formed of a plastic material and having its concave surface facing the light deflector 6 side and having strong positive power, and a second scanning lens 62b formed of a plastic material and having its convex surface facing the light deflector 6 side and having weak positive power, and the optical axes of the first and second scanning lenses 62a and 62b are both disposed in the main scanning cross-section.

In the present embodiment, the first optical system 61 is comprised of a so-called underfield scanning optical system which causes a beam passed therethrough to be incident in a state in which the beam width thereof in the main scanning direction is narrower than the width of the deflecting surface 6a of the light deflector 6, and the beam caused to be incident on the deflecting surface 6a of the light deflector 6 is caused to be incident at an angle of 1.3° with respect to the main scanning plane in the sub-scanning cross-section.

That is, in the present embodiment, the first and second scanning lenses 62a and 62b are disposed such that the beam from the deflecting surface 6a incident thereon is incident on a position deviating by a predetermined amount upwardly in the sub-scanning direction from the surface vertex in the sub-scanning cross-section at the central position of the first and second scanning lenses 62a and 62b in the main scanning direction, and are disposed such that the first and second scanning lenses 62a and 62b are downwardly tilted with respect to the incident beam.

While in the aforedescribed Embodiment 1, only the correcting lens is disposed as described above, in the present embodiment, the two first and second scanning lenses 62a and 62b are disposed as described above, whereby the correction of the spot shape and the correction of the curvature of the scanning lines are effected more effectively.

Figure 13:
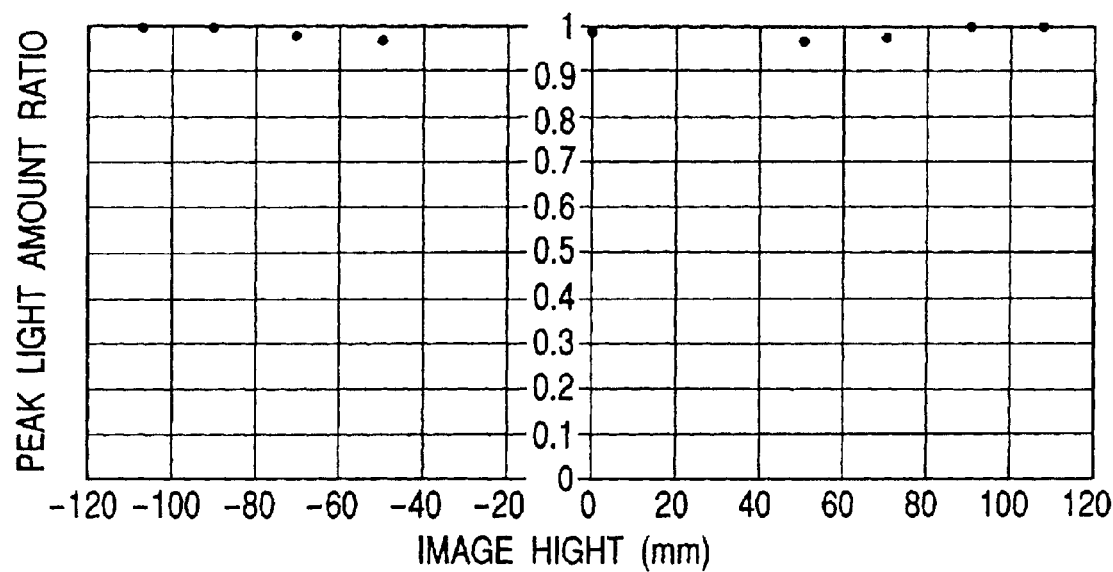
FIG. 13 shows the peak intensity ratio of an imaged spot in Embodiment 2 of the present invention.

FIG. 13 is an illustration showing the ratio between the maximum value $E_{MAX}$ and minimum value $E_{MIN}$ of the absolute value of the peak intensity of the wave-optical intensity distribution of each spot in the effective scanning area on the surface to be scanned in the present embodiment. As shown in FIG. 13, the aforementioned conditional expression (1) is satisfied over the entire effective scanning area, whereby there is obtained a light scanning optical system which is free of the deterioration of the output image and is suitable for a highly definite image output.

Figure 14:
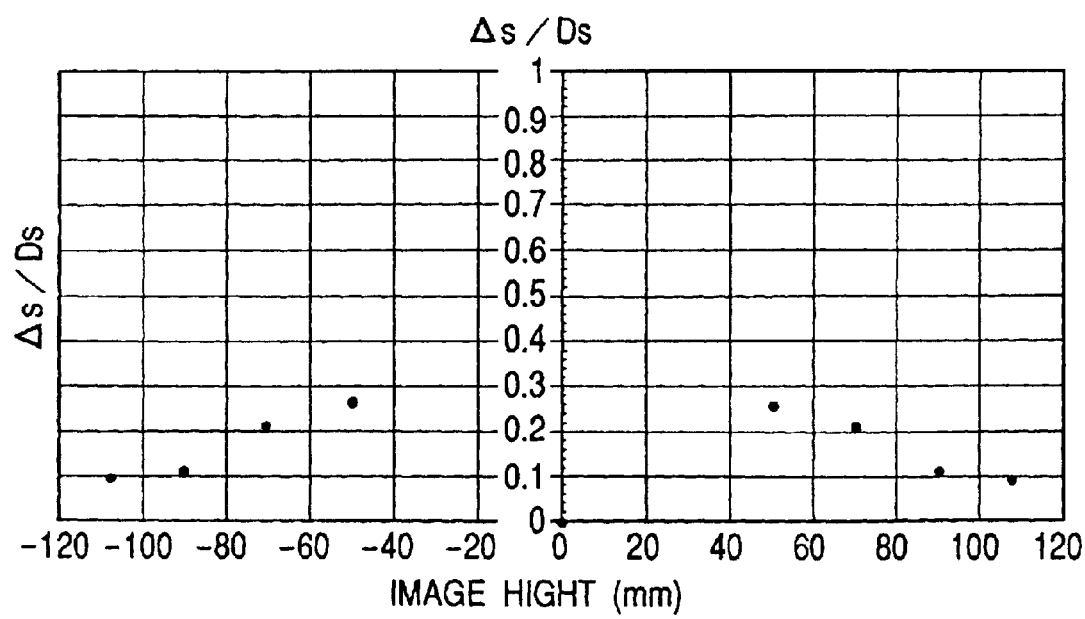
FIG. 14 shows the characteristic of $\Delta s/Ds$ in Embodiment 2 of the present invention.

FIG. 14 is an illustration showing the characteristic value of ∆s/Ds in the present embodiment. As shown in FIG. 14, the aforementioned conditional expressions (2) and (3) are satisfied over the entire effective scanning area, whereby there is obtained a light scanning optical system which is free of the deterioration of the output image and is suitable for a highly definite image output.

Table 2 below shows the characteristics of the light scanning optical system according to the present embodiment.

In Table 2, the aspherical shape of the first and second scanning lenses in the main scanning cross-section, when the point of intersection between each lens surface and the optical axis is the origin and the direction of the optical axis is defined as the X-axis and the axis orthogonal to the optical axis in the main scanning cross-section is defined as the Y-axis and the axis orthogonal to the optical axis in the sub-scanning cross-section is defined as the Z-axis, is represented by the following expression:

$$X = \frac{y^2/Rm}{1 + (1 - (1+k)(y/Rm)^2)^{1/2}} + B_4 y^4 + B_6 y^6 + B_8 y^8 + B_{10} y^{10},$$

where Rm is the radius of curvature, and k and $B_4$–$B_{10}$ are aspherical surface coefficients.

Also, as regards the shape of the sub-scanning cross-section, the radius of curvature Rs' of which the lens surface coordinates in the main scanning direction are Y is represented by the following expression:

$$Rs' = Rs(1 + D_2 y^2 + D_4 y^4 + D_6 y^6 + D_8 y^8 + 10_{10} y^{10}),$$

where Rs is the radius of curvature on the optical axis, and $D_1$–$D_{10}$ are coefficients.

TABLE 2

| wavelength used | | λ(nm) | 780 |
|---|---|---|---|
| incident light on polygon | | parallel beam | |
| shape of aperture stop | | main scanning 3.08 × sub-scanning 3.64 elliptical shape | |
| aperture stop - cylindrical lens | | d1 | 10.00 |
| cylindrical lens - polygon reflecting point | | d2 | 111.80 |
| polygon reflecting point - first surface of scanning lens | | d3 | 24.50 | shape of first scanning lens

| first surface | | second surface | |
|---|---|---|---|
| Rm | −62.044 | Rm | −35.199 |
| k | −4.611E+00 | k | −2.130E+00 |
| B4 | 2.852E−06 | B4 | −4.482E−07 |
| B6 | 0.000E+00 | B6 | 2.061E−09 |
| B8 | 0.000E+00 | B8 | −2.364E−14 |
| B10 | 0.000E+00 | B10 | 0.000E+00 |
| Rs | −62.044 | Rs | −59.177 |
| D2 | 1.052E−03 | D2u | −6.238E−05 |
| D4 | 3.610E−06 | D4u | −1.980E−06 |
| D6 | −4.197E−09 | D6u | 2.961E−09 |
| D8 | −7.328E−12 | D8u | 0.000E+00 |
| D10 | 2.274E−14 | D10u | 0.000E+00 |

| thickness of first scanning lens | d4 | 8.00 |
|---|---|---|
| refractive index of first scanning lens | N1 | 1.5242 |
| first scanning lens - second scanning lens | d5 | 15.37 | shape of first scanning lens

| first surface | | second surface | |
|---|---|---|---|
| Rm | 87.010 | Rm | 85.490 |
| k | −8.976E−01 | k | −1.633E+01 |
| B4 | −4.413E−06 | B4 | −3.137E−06 |
| B6 | 2.330E−09 | B6 | 1.421E−09 |
| B8 | −7.821E−13 | B8 | −3.962E−13 |
| B10 | 8.994E−17 | B10 | 2.396E−17 |
| Rs | −37.273 | Rs | −13.718 |
| D2 | 3.609E−03 | D2u | 1.253E−03 |
| D4 | 3.975E−06 | D4u | −1.133E−06 |
| D6 | 6.179E−11 | D6u | 7.296E−10 |
| D8 | −5.225E−13 | D8u | −2.746E−13 |
| D10 | 0.000E+00 | D10u | 4.203E−17 |

| thickness of second scanning lens | d6 | 7.00 |
|---|---|---|
| refractive index of second scanning lens | N2 | 1.5242 |
| second scanning lens - surface to be scanned | d7 | 119.00 |
| sub-scanning magnification of second optical system (scanning lens) | β | 2.240 |
| amount of shift of first surface and second surface of first scanning lens in sub-scanning direction | Shift1 | −0.55 |
| amount of tilt of first surface and second surface of first scanning lens | Tilt1 | −1.30 |
| amount of shift of first surface and second surface of second scanning lens in sub-scanning direction | Shift2 | −1.02 |
| amount of tilt of first surface and second surface of second scanning lens | Tilt2 | −1.30 |
| sub-scanning angle of incidence on first optical system | α | 1.30 |
| maximum scanning angle | θmax | 45.00 |
| polygon | φ40 hexahedron | |

While in each of Embodiments 1 and 2, the defecting surface of the light deflector is supposed as a flat surface, it is also possible that the beam incident on this light deflector is a convergent beam and the shape of the deflecting surface is a convex surface shape or the light scanning optical system is a light scanning optical system of the post-objective type. In the case of the light scanning optical system of this post-objective type, an oblique incidence optical system is requisite from the symmetry of aberration correction and therefore, the light scanning optical system of the present invention can be said to be best suited. Also, in the case of the light scanning optical system of the post-objective type, the power of the scanning lens constituting the second optical system (the fθ lens system) in the main scanning direction can be weakened and therefore, it becomes possible to reduce the deterioration of the optical characteristic to the environmental fluctuation when an inexpensive plastic material is used for the scanning lens and thus, by applying the light scanning optical system of the present invention, it is possible to obtain a light scanning optical system more suitable for a high quality of image.

Also, while in each of Embodiments 1 and 2, there has been shown a light scanning optical system in which the beam from the first optical system is reflected and deflected only once by the deflecting surface of the light deflector to thereby effect light scanning, the present invention is not restricted thereto, but like the aforedescribed Embodiments 1 and 2, the present invention can also be applied to a so-called twice-incidence scanning type light scanning optical system of a construction in which, for example, a beam from a first optical system is caused to be incident on a first deflecting surface of a light deflector and the beam reflected and deflected by this first deflecting surface is caused to be again incident on a second deflecting surface of the light deflector through a transmitting optical system.

That is, in this twice-incidence scanning type light scanning optical system, for example, a beam emitted from light source means is caused by the first optical system to be incident on the first deflecting surface of the light deflector at a predetermined angle from an oblique direction in the sub-scanning cross-section, and the beam reflected and deflected by the first deflecting surface is transmitted through a first lens and is reflected by a first mirror, and the beam reflected by the first mirror is transmitted through second and third lenses and is reflected by a second mirror, whereafter it is caused to be incident again on a second deflecting surface of the light deflector differing from the first deflecting surface, and is reflected and deflected by the second deflecting surface, whereafter a spot is formed on the surface to be scanned by a second optical system to thereby effect light scanning. The first, second and third lenses and the first and second mirrors together constitute an element of the transmitting optical system.

Such a twice-incidence scanning type light scanning optical system always assumes the construction of an oblique incidence optical system, and the uniformity of the peak intensity by the collapse of the spot shape as previously described poses a problem. By applying the light scanning optical system according to Embodiment 1 or 2 of the present invention to the twice-incidence scanning type, the uniformity of the peak intensity of the spot which has heretofore posed a problem is improved, and it becomes possible to obtain a light scanning optical system more advantageous for a high-speed and highly definite image output.

Figure 15:
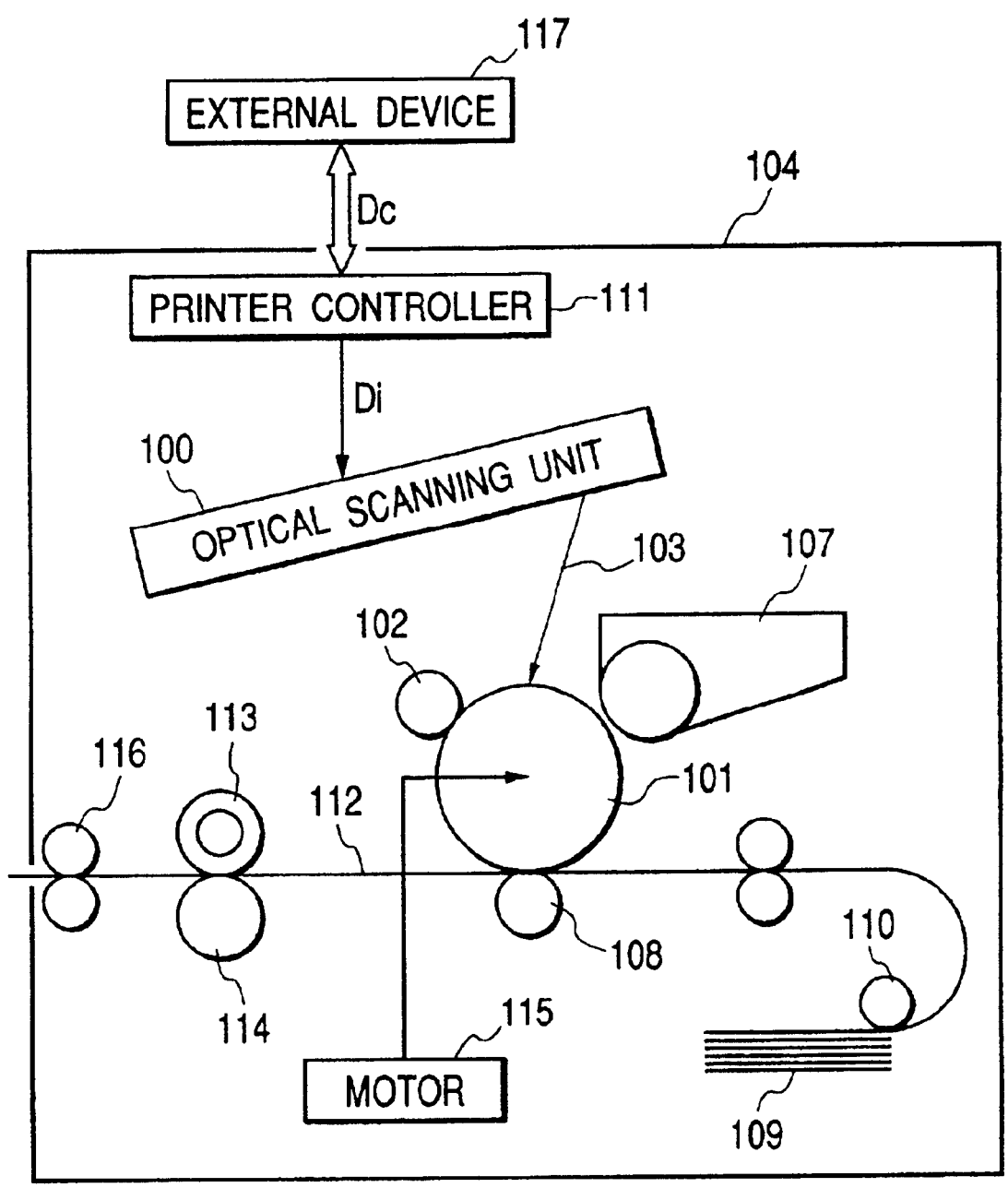
FIG. 15 is a cross-sectional view of essential portions in the sub-scanning direction showing an example of the construction of an electrophotographic printer using the light scanning optical system of the present invention.
Figure 16:
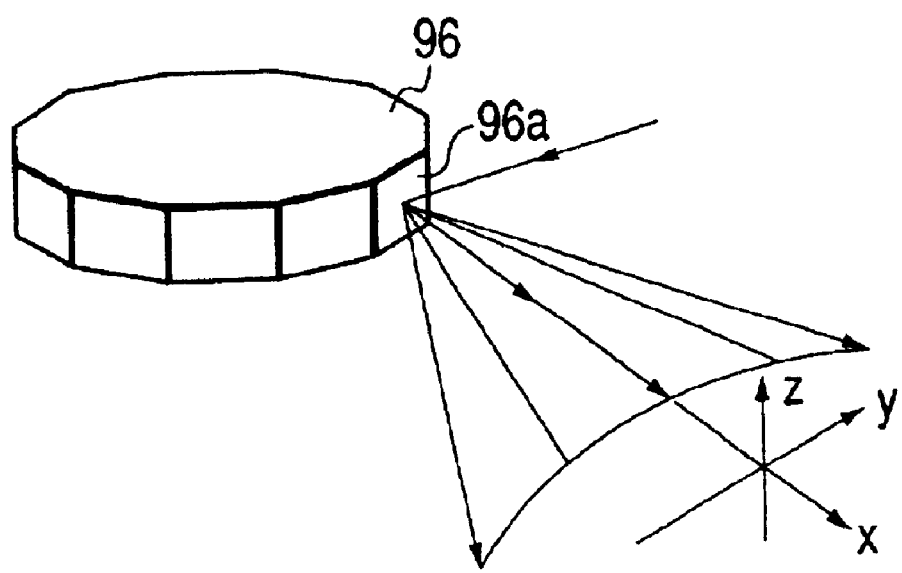
FIG. 16 illustrates the state after an obliquely incident beam is reflected and deflected by a light deflector.
Figure 17:
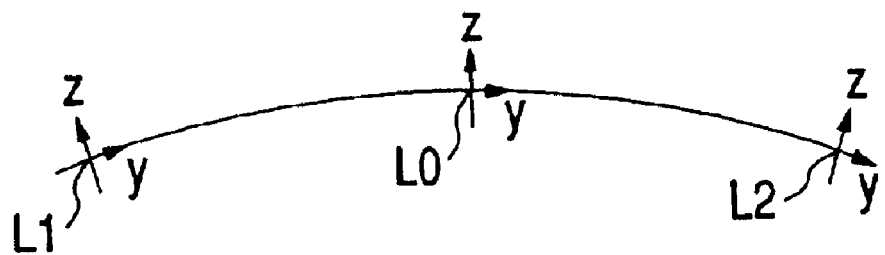
FIG. 17 illustrates the coordinate system after the obliquely incident beam is reflected and deflected by the light deflector.

FIG. 15 is a cross-sectional view of essential portions in the sub-scanning direction showing an example of the construction of an electrophotographic printer which is an image forming apparatus using the light scanning optical system (optical scanning apparatus) of the present invention.

In FIG. 15, the reference numeral 104 designates the image forming apparatus. Code data Dc is inputted from an external device 117 such as a personal computer to this image forming apparatus 104. This code data Dc is converted into image data (dot data) Di by a printer controller 111 in the apparatus. This image data Di is inputted to an optical scanning unit 100 having the construction shown in Embodiments 1 to 2. A light beam 103 modulated in conformity with the image data Di is emitted from this optical scanning unit 100, and by this light beam 103, the photosensitive surface of a photosensitive drum 101 is scanned in the main scanning direction.

The photosensitive drum 101 which is an electrostatic latent image bearing member (photosensitive body) is clockwisely rotated by a motor 115. With this rotation, the photosensitive surface of the photosensitive drum 101 moves relative to the light beam 103 in the sub-scanning direction orthogonal to the main scanning direction. Above the photosensitive drum 101, a charging roller 102 for uniformly charging the surface of the photosensitive drum 101 is provided so as to abut against the surface of the drum 101. The light beam 103 scanned by the optical scanning unit 100 is applied to the surface of the photosensitive drum 101 charged by the charging roller 102.

As previously described, the light beam 103 is modulated on the basis of the image data Di, and by this light beam 103 being applied, an electrostatic latent image is formed on the surface of the photosensitive drum 101. This electrostatic latent image is developed as a toner image by a developing device 107 disposed so as to abut against the photosensitive drum 101 further downstream of the applied position of the light beam 103 with respect to the direction of rotation of the photosensitive drum 101.

The toner image developed by the developing device 107 is transferred onto paper 112 which is a transferring material by a transferring roller 108 disposed below the photosensitive drum 101 so as to be opposed to the photosensitive drum 101. The paper 112 is contained in a paper cassette 109 disposed forwardly (on the right side as viewed in FIG. 15) of the photosensitive drum 101 but paper feeding can also be manually done. A paper feeding roller 110 is disposed at an end portion of the paper cassette 109 and feeds the paper 112 in the paper cassette 109 into a conveying path.

The paper 112 to which the unfixed toner image has been transferred in the manner described above is further conveyed to a fixing device disposed rearwardly (on the left side as viewed in FIG. 15) of the photosensitive drum 101. The fixing device is comprised of a fixing roller 113 having a fixing heater (not shown) therein and a pressurizing roller 114 disposed so as to be in pressure contact with the fixing roller 113, and pressurizes and heats the paper 112 conveyed from the transferring portion in the pressure contact portion between the fixing roller 113 and the pressurizing roller 114 to thereby fix the unfixed toner image on the paper 112. Further, paper discharge rollers 116 are disposed rearwardly of the fixing roller 113 and discharge the fixed paper 112 out of the image forming apparatus.

Although not shown in FIG. 15, the printer controller 111 effects not only the aforedescribed conversion of the data, but also the control of various portions in the image forming apparatus including the motor 115 and a polygon motor, etc. in the optical scanning unit which will be described later.

The above-described image forming apparatus is also suitable for an image forming apparatus of the so-called background exposure type in which, for example, a portion not exposed by a spot imaged on a surface to be scanned is developed as an image. In the case of the image forming apparatus of the background exposure type, it is necessary to expose, for example, a back white portion free of image information by a spot. If in this case, the deterioration of the spot by an oblique incidence optical system is not sufficiently corrected, there will occur the phenomenon that the back white does not perfectly become white and the deteriorated portion of the spot is fogged blackly.

In the image forming apparatus of the present invention, the uniformity of the absolute value of the peak intensity in the light intensity distribution of the spot is corrected well and therefore, even if the background exposure type is adopted, it becomes possible to obtain output images of a high quality free of fog.

According to the present invention, as previously described, there can be achieved a light scanning optical system and an optical scanning apparatus using an oblique incidence optical system, and an image forming apparatus using the same in which the uniformity of the peak intensity in the light intensity distribution of the spot on the surface to be scanned which has heretofore not been considered is corrected well, whereby which are high in speed and definition and generally compact and simple in construction.

What is claimed is:

1. A light scanning optical system comprising an incidence optical system for causing a beam emitted from light source means to be incident on a deflecting surface of a light deflector from an oblique direction in a sub-scanning cross-section, and an imaging optical system for imaging the beam reflected and deflected by said light deflector on a surface to be scanned, wherein when a maximum value and a minimum value of a peak intensity in an effective scanning area of a spot imaged on said surface to be scanned by said imaging optical system are defined as $E_{MAX}$ and $E_{MIN}$, respectively, the following condition is satisfied:

$$0.8 \leq \frac{E_{MIN}}{E_{MAX}},$$

and wherein when a difference in an incidence point in a sub-scanning direction on said surface to be scanned between two marginal rays of the beam reflected and deflected by the deflecting surface of said light deflector in the main scanning direction is defined as $\Delta s$ and a diameter of the spot imaged on said surface to be scanned which becomes $1/e^2$ relative to the peak intensity in the sub-scanning direction is defined as Ds, the following condition is satisfied:

$$\frac{\Delta s}{Ds} \leq 0.9.$$

2. A light scanning optical system according to claim 1, wherein when a beam width of the beam reflected and deflected by the deflecting surface of said light deflector in the main scanning direction is defined as d and an angle of incidence at which the beam from said incidence optical system is incident on said deflecting surface from the oblique direction with respect to a plane containing a normal to the deflecting surface of said light deflector in the sub-scanning cross-section and parallel to the main scanning direction is defined as $\alpha$ and a scanning angle of the beam reflected and deflected by the deflecting surface of said light deflector is defined as $\theta$ and a lateral magnification of said imaging optical system in the sub-scanning direction is defined as $\beta$, the following condition is satisfied:

$$\frac{2 \times d \times \tan\left(\frac{\theta}{2}\right) \times (\sin\alpha) \times \beta}{Ds} \leq 0.9.$$

3. A light scanning optical system according to claim 1, wherein an optical axis of at least one lens surface constituting said imaging optical system in the sub-scanning cross-section is shifted in the sub-scanning direction relative to a center axis of the beam reflected and deflected by said deflecting surface and travelling toward a central position of the effective scanning area or/and is inclined in the sub-scanning direction.

4. A light scanning optical system according to claim 1, wherein a height of an optical axis of a lens surface of at least one of a plurality of lenses constituting said imaging optical system in the sub-scanning cross-section continuously varies in conformity with a lengthwise position in the main scanning direction.

5. A light scanning optical system according to claim 1, wherein at least one lens of a plurality of lenses constituting said imaging optical system also constitute said incidence optical system.

6. A light scanning optical system according to claim 1, wherein the beam emitted from said light source means is incident on the deflecting surface of said light deflector in a state in which it is wider than a width of said deflecting surface in a main scanning direction.

7. A light scanning optical system according to claim 1, wherein the beam emitted from said light source means is incident on the deflecting surface from substantially the center of a scanning angle by said light deflector.

8. A light scanning optical system according to claim 1, wherein said light source means is a multibeam laser source having a plurality of light emitting portions.

9. A light scanning optical system comprising an incidence optical system for causing a beam emitted from light source means to be incident on a deflecting surface of a light deflector from an oblique direction in a sub-scanning cross-section, and an imaging optical system for imaging the beam reflected and deflected by said light deflector on a surface to be scanned, wherein when a maximum value and a minimum value of a peak intensity in an effective scanning area of a spot imaged on said surface to be scanned by said imaging optical system are defined as $E_{MAX}$ and $E_{MIN}$, respectively, the following condition is satisfied:

$$0.8 \leq \frac{E_{MIN}}{E_{MAX}},$$

wherein a lens surface of at least one lens constituting said imaging optical system has its radius of curvature in the sub-scanning cross-section continuously varied away from an optical axis of the lens surface in a main scanning direction.

10. An optical scanning apparatus characterized by using a light scanning optical system according to any one of claims 1 and 3 to 8.

11. An image forming apparatus provided with an optical scanning apparatus according to claim 10, and a printer controller for converting code data inputted from an external device into an image signal and it to said optical scanning apparatus.

12. An image forming apparatus according to claim 11, wherein an image is formed by background exposure.

13. A light scanning optical system in which a beam emitted from light source means is caused by an incidence optical system to be incident on a first deflecting surface of a light deflector having a plurality of deflecting surfaces from an oblique direction in a sub-scanning cross-section, and the beam reflected and deflected by said first deflecting surface is caused to be again incident on a second deflecting surface of said light deflector differing from said first deflecting surface through a transmitting optical system, and the beam reflected and deflected by said second deflecting surface is imaged on a surface to be scanned by an imaging optical system, and in the sub-scanning cross-section, wherein when maximum value and a minimum value of a peak intensity in an effective scanning area of a spot imaged on said surface to be scanned by said imaging optical system are defined as $E_{MAX}$ and $E_{MIN}$, respectively, the following condition is satisfied:

$$0.8 \leq \frac{E_{MIN}}{E_{MAX}}.$$

14. A light scanning optical system according to claim 13, wherein when a difference in an incidence point in a sub-scanning direction on said surface to be scanned between two marginal rays of the beam reflected and deflected by the second deflecting surface of said light deflector in main scanning direction is defined as $\Delta s$ and a diameter of the spot imaged on said surface to be scanned which becomes $1/e^2$ relative to the peak intensity in the sub-scanning direction is defined as Ds, the following condition is satisfied:

$$\frac{\Delta s}{Ds} \leq 0.9.$$

15. A light scanning optical system according to claim 14, wherein when a beam width of the beam reflected and deflected by the second deflecting surface of said light deflector in the main scanning direction is defined as d and an angle of incidence at which the beam from said incidence optical system is incident on said first deflecting surface from the oblique direction with respect to a plane containing a normal to the first deflecting surface of said light deflector in the sub-scanning cross-section and parallel to the main scanning direction is defined as α and a scanning angle of the beam reflected and deflected by the second deflecting surface of said light deflector is defined as θ and a lateral magnification of said imaging optical system in the sub-scanning direction is defined as β, the following condition is satisfied:

$$\frac{2 \times d \times \tan\left(\frac{\theta}{2}\right) \times (\sin\alpha) \times \beta}{Ds} \leq 0.9.$$

16. A light scanning optical system according to claim 14, wherein an optical axis of a lens surface of at least one of a plurality of lenses constituting said imaging optical system in the sub-scanning cross-section is shifted in the sub-scanning direction relative to a center axis of the beam reflected and deflected by said deflecting surface and travelling toward a central position of the effective scanning area or/and is inclined in the sub-scanning direction.

17. A light scanning optical system according to claim 14, wherein a height of an optical axis of a lens surface of at least one of a plurality of lenses constituting said imaging optical system in the sub-scanning cross-section continuously varies in conformity with a lengthwise position in the main scanning direction.

18. A light scanning optical system according to claim 13, wherein at least one lens of a plurality of lenses constituting said imaging optical system also constitute said incidence optical system.

19. A light scanning optical system according to claim 13, wherein the beam emitted from said light source means is incident on the first deflecting surface of said light deflector in a state in which it is wider than a width of said first deflecting surface in a main scanning direction.

20. A light scanning optical system according to claim 13, wherein the beam emitted from said light source means is incident on the first deflecting surface from substantially the center of a scanning angle by said light deflector.

21. A light scanning optical system according to claim 13, wherein a lens surface of at least one of a plurality of lenses constituting said imaging optical system has its radius of curvature in the sub-scanning cross-section continuously varied away from an optical axis of the lens surface in a main scanning direction.

22. A light scanning optical system according to claim 13, wherein said light source means is a multibeam laser source having a plurality of light emitting portions.

23. An optical scanning apparatus characterized by using a light scanning optical system according to any one of claims 13 to 22.

24. An image forming apparatus provided with an optical scanning apparatus according to claim 23, and a printer controller for converting code data inputted from an external device into an image signal and inputting it to said optical scanning apparatus.

25. An image forming apparatus according to claim 24, wherein an image is formed by background exposure.

26. A light scanning optical system comprising an incidence optical system for causing a beam emitted from light source means to be incident on a deflecting surface of a light deflector from an oblique direction in a sub-scanning cross-section, wherein the beam emitted from said light source means is incident on the deflecting surface of the light deflector in a state in which the beam is narrower than a width of the deflecting surface in a main scanning direction, and an imaging optical system for imaging the beam reflected an deflected by said light deflector on a surface to be scanned, wherein when a maximum value and a minimum value of a peak intensity in an effective scanning area of a spot imaged on said surface to be scanned by said imaging optical system are defined as $E_{MAX}$ and $E_{MIN}$, respectively, the following condition is satisfied:

$$0.8 \leq \frac{E_{\text{MIN}}}{E_{\text{MAX}}},$$

and wherein when a difference in an incidence point in a sub-scanning direction on said surface to be scanned between two marginal rays of the beam reflected and deflected by the deflecting surface of said light deflector in the main scanning direction is defined as Δs and a diameter of the spot imaged on said surface to be scanned which becomes $1/e^2$ relative to the peak intensity in the sub-scanning direction is defined as Ds, the following condition is satisfied:

$$\frac{\Delta s}{Ds} \leq 0.9.$$

27. A light scanning optical system comprising an incidence optical system for causing a beam emitted from light source means to be incident on a deflecting surface of a light deflector from an oblique direction in a sub-scanning cross-section, wherein the beam emitted from said light source means is incident on the deflecting surface of the light deflector in a state in which the beam is narrower than a width of the deflecting surface in a main scanning direction, and an imaging optical system for imaging the beam reflected and deflected by said light deflector on a surface to be scanned, wherein when a maximum value and a minimum value of a peak intensity in an effective scanning area of a spot imaged on said surface to be scanned by said imaging optical system are defined as $E_{MAX}$ and $E_{MIN}$, respectively, the following condition is satisfied:

$$0.8 \leq \frac{E_{\text{MIN}}}{E_{\text{MAX}}},$$

wherein a lens surface of at least one lens constituting said imaging optical system has its radius of curvature in the sub-scanning cross-section continuously varied away from an optical axis of the lens surface in a main scanning direction.

28. A light scanning optical system in which a beam emitted from light source means is caused by an incidence optical system to be incident on a first deflecting surface of a light deflector having a plurality of deflecting surfaces from an oblique direction in a sub-scanning cross-section, wherein the beam emitted from said light source means is incident on the deflecting surface of the light deflector in a state in which the beam is narrower than a width of the deflecting surface in a main scanning direction, and the beam reflected and deflected by said first deflecting surface is caused to be again incident on a second deflecting surface of said light deflector differing from said first deflecting surface through a transmitting optical system, and the beam reflected and deflected by said second deflecting surface is imaged on a surface to be scanned by an imaging optical system, and in the sub-scanning cross-section, wherein when a maximum value and a minimum value of a peak intensity in an effective scanning area of a spot imaged on said surface to be scanned by said imaging optical system are defined as $E_{MAX}$ and $E_{MIN}$, respectively, the following condition is satisfied:

$$0.8 \leq \frac{E_{MIN}}{E_{MAX}}.$$

29. An optical scanning apparatus characterized by using a light scanning optical system according to any one of claims 26 to 28.

30. An image forming apparatus provided with an optical scanning apparatus according to claim 29, and a printer controller for converting code data inputted from an external device into an image signal and inputting it to said optical scanning apparatus.

* * * * *

UNITED STATES PATENT AND TRADEMARK OFFICE
CERTIFICATE OF CORRECTION

PATENT NO. : 6,954,295 B2
DATED : October 11, 2005
INVENTOR(S) : Yoshihiro Ishibe It is certified that error appears in the above-identified patent and that said Letters Patent is hereby corrected as shown below:

Drawings,
Figures 6, 9, 13 and 14, "HIGHT" should read -- HEIGHT --.

Column 3,
Line 35, "expause" should read -- expanse --.

Column 7,
Line 57, "sate" should read -- state --.

Column 9,
Line 3, "a" should read -- $\alpha$ --.

Column 14,
Lines 3 and 8, "expause" should read -- expanse --;
Line 63, "I/IO" should read -- $I/I_0$ --.

Column 18,
Table 1, "lectangular" should read -- rectangular --.

Column 20,
Line 31, "as" should read -- as to --.

Column 22,
Line 65, "$10_{10}y^{10}$)," should read -- $D_{10}y^{10}$), --.

UNITED STATES PATENT AND TRADEMARK OFFICE
CERTIFICATE OF CORRECTION

PATENT NO. : 6,954,295 B2
DATED : October 11, 2005
INVENTOR(S) : Yoshihiro Ishibe It is certified that error appears in the above-identified patent and that said Letters Patent is hereby corrected as shown below:

Column 28,
Line 30, "claims 1 and 3 to 8" should read -- claims 1 to 9 --.

Column 30,
Line 15, "an" should read -- and --.

Signed and Sealed this

Eighteenth Day of April, 2006

JON W. DUDAS
*Director of the United States Patent and Trademark Office*